US012723188B2

(12) United States Patent
Lee et al.

(10) Patent No.: US 12,723,188 B2
(45) Date of Patent: Sep. 1, 2026

(54) HEAT DISSIPATION MATERIAL, COMPOSITION INCLUDING SAME, AND PREPARATION METHOD THEREFOR

(71) Applicant: KOREA INSTITUTE OF CERAMIC ENGINEERING AND TECHNOLOGY, Jinju-si (KR)

(72) Inventors: Seung Hyup Lee, Jinju-si (KR); Gyeong Ho Yun, Gyeongsan-si (KR); Yun Jin Kim, Sejong-si (KR); Su Hyeon Cho, Changwon-si (KR); Min Ho Nam, Jinju-si (KR)

(73) Assignee: KOREA INSTITUTE OF CERAMIC ENGINEERING AND TECHNOLOGY, Jinju-si (KR)

( * ) Notice: Subject to any disclaimer, the term of this patent is extended or adjusted under 35 U.S.C. 154(b) by 529 days.

(21) Appl. No.: 18/360,963

(22) Filed: Jul. 28, 2023

(65) Prior Publication Data

US 2024/0043732 A1 Feb. 8, 2024

Related U.S. Application Data

(63) Continuation of application No. PCT/KR2022/016099, filed on Oct. 21, 2022.

(30) Foreign Application Priority Data

Dec. 22, 2021 (KR) ........................ 10-2021-0184508
Sep. 26, 2022 (KR) ........................ 10-2022-0121905
Oct. 20, 2022 (KR) ........................ 10-2022-0135470

(51) Int. Cl.
*C09K 5/14* (2006.01)

(52) U.S. Cl.
CPC ..................................... *C09K 5/14* (2013.01)

(58) Field of Classification Search
CPC ..... C09K 5/14; C01B 21/0646; H10W 40/25; H10W 40/251; C08J 3/226; C08J 2363/00; C08J 2400/00; C08K 3/013; C08K 3/04; C08K 3/14; C08K 3/30; C08K 3/32; C08K 9/08; C08K 2003/221; C08K 2003/282;
(Continued)

(56) References Cited

U.S. PATENT DOCUMENTS

2016/0009975 A1 1/2016 Timmerman et al.
2016/0340191 A1 11/2016 Ikemiya et al.
2020/0040245 A1 2/2020 Takeda et al.

FOREIGN PATENT DOCUMENTS

JP 2006249314 * 3/2005
JP 2006249314 A * 9/2006
(Continued)

OTHER PUBLICATIONS

International Search Report mailed Jan. 27, 2023 for International Application No. PCT/KR2022/016099. 2 pages.
(Continued)

*Primary Examiner* — Cephia D Toomer
(74) *Attorney, Agent, or Firm* — Secant IP, P.L.L.C.

(57) ABSTRACT

A heat dissipation material is provided. In the heat dissipation material with a filler, comprising secondary particles in which primary particles are aggregated, the filler in a polymer resin matrix may form a thermal interface layer for conduction of thermal energy between a heat generation part and a heat absorption part.

7 Claims, 32 Drawing Sheets

(58) Field of Classification Search
CPC ...... C08K 2003/3009; C08K 2003/385; C08K 2201/005; C08K 2201/006; C08K 3/38
See application file for complete search history.

(56) References Cited

FOREIGN PATENT DOCUMENTS

| | | | |
|---|---|---|---|
| JP | 2012-171842 | A | 9/2012 |
| JP | 2015193752 | * | 11/2015 |
| JP | 2018-104253 | A | 7/2018 |
| KR | 10-2016-0117472 | A | 10/2016 |
| KR | 10-2017-0032278 | A | 3/2017 |
| KR | 10-1797671 | B1 | 11/2017 |
| KR | 10-2019-0058482 | A | 5/2019 |
| KR | 10-2021-0073257 | A | 6/2021 |

OTHER PUBLICATIONS

Written Opinion of the International Searching Authority mailed Jan. 27, 2023 for International Application No. PCT/KR2022/016099. 9 pages.

* cited by examiner

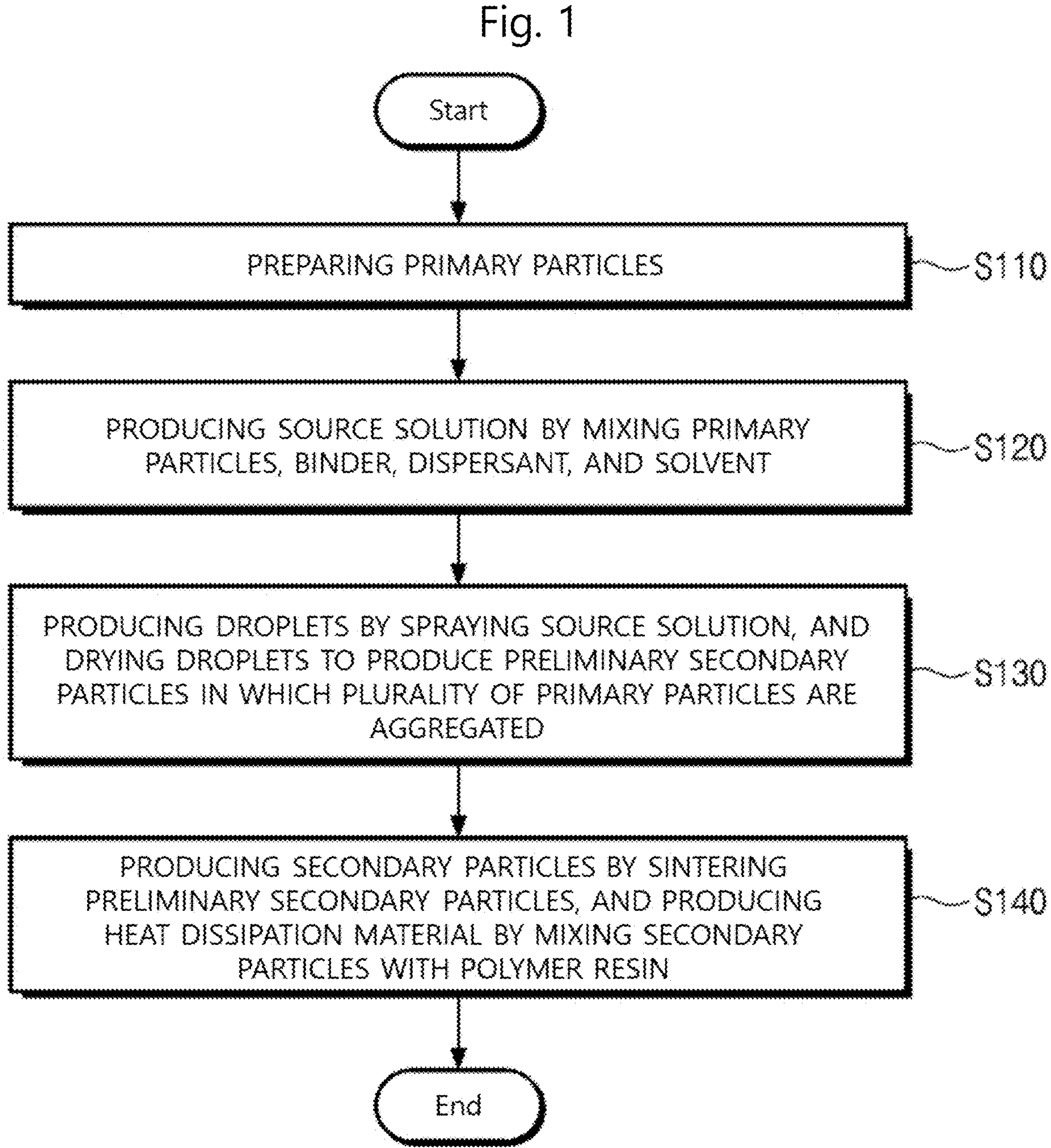
Fig. 1
Start
PREPARING PRIMARY PARTICLES
S110
PRODUCING SOURCE SOLUTION BY MIXING PRIMARY PARTICLES, BINDER, DISPERSANT, AND SOLVENT
S120
PRODUCING DROPLETS BY SPRAYING SOURCE SOLUTION, AND DRYING DROPLETS TO PRODUCE PRELIMINARY SECONDARY PARTICLES IN WHICH PLURALITY OF PRIMARY PARTICLES ARE AGGREGATED
S130
PRODUCING SECONDARY PARTICLES BY SINTERING PRELIMINARY SECONDARY PARTICLES, AND PRODUCING HEAT DISSIPATION MATERIAL BY MIXING SECONDARY PARTICLES WITH POLYMER RESIN
S140
End Fig. 5
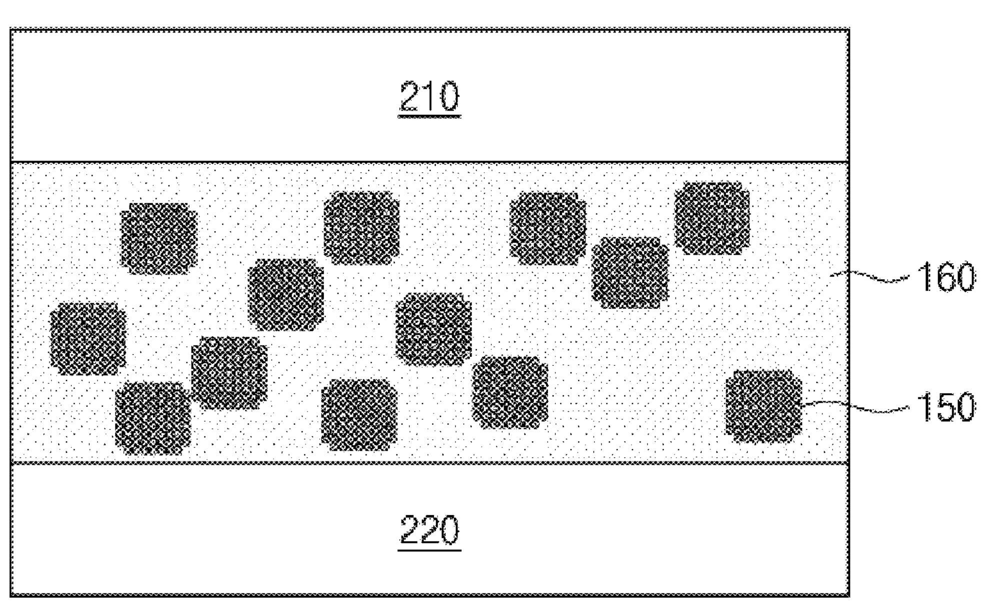
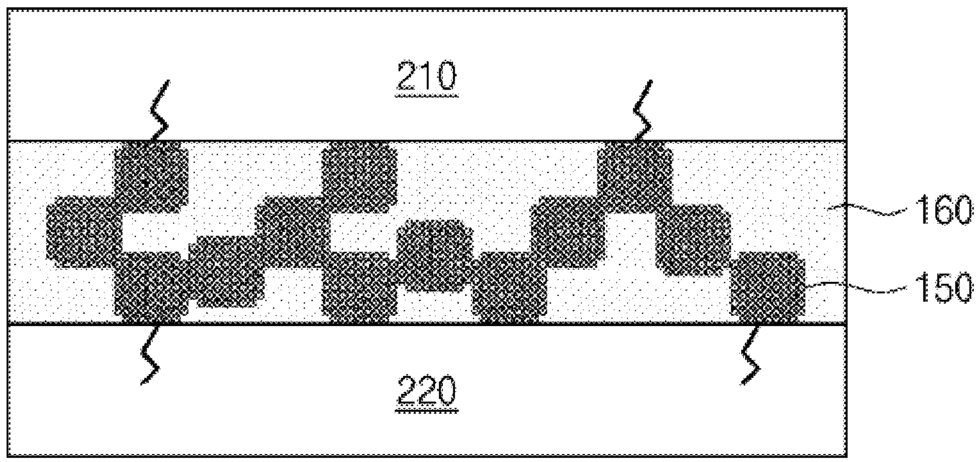

Fig. 6
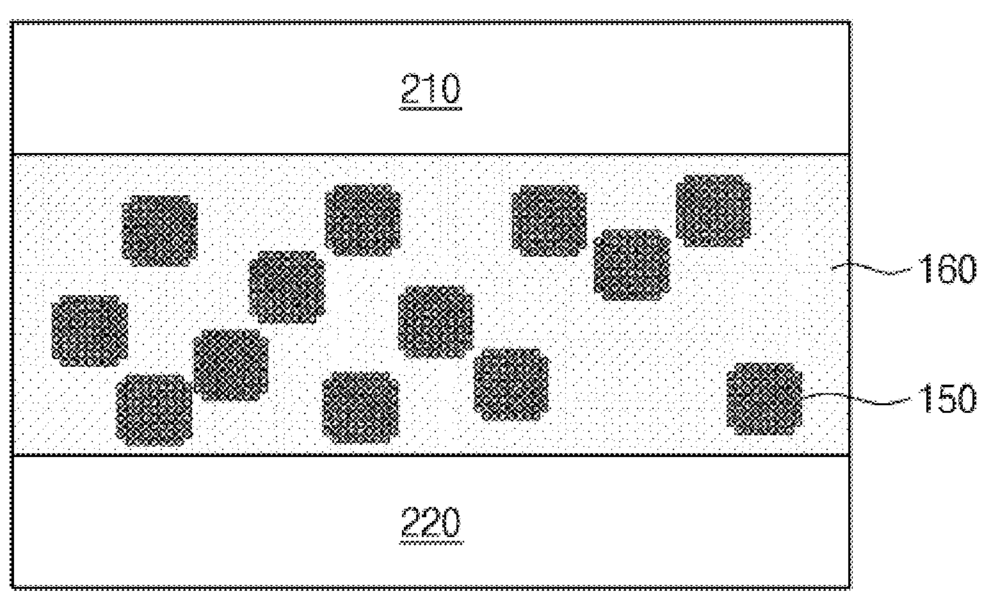
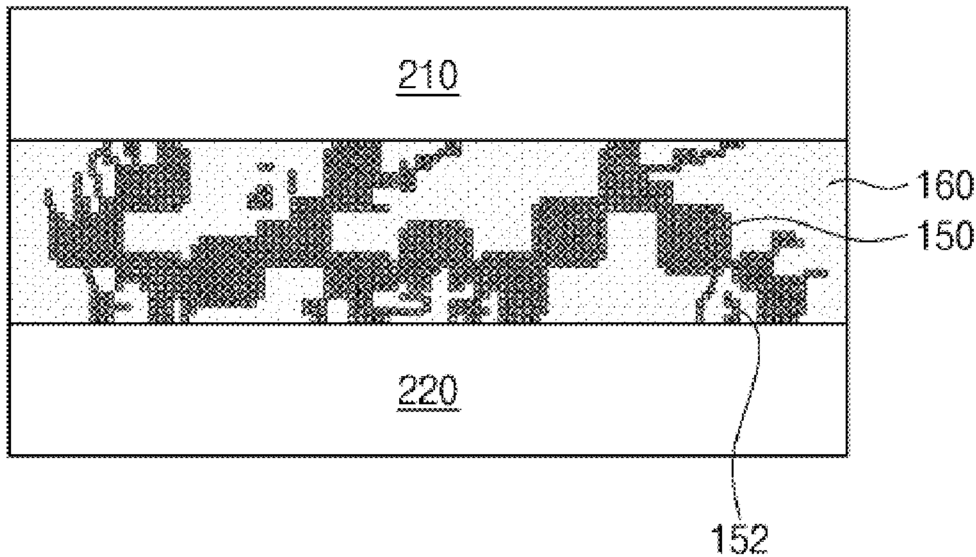

Fig. 7
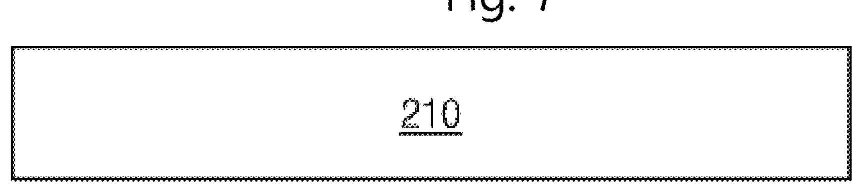
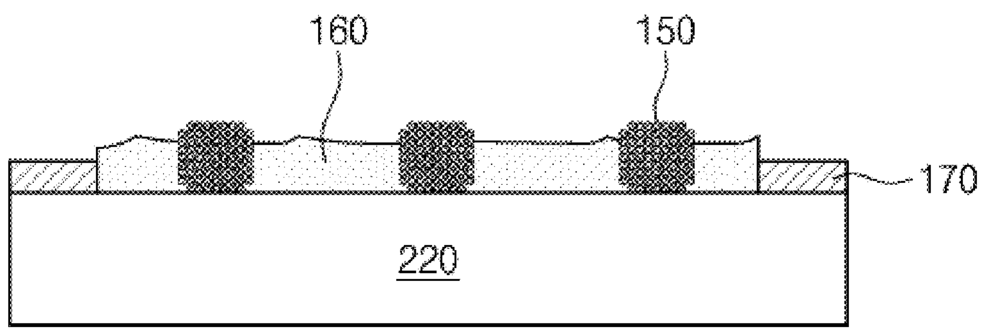
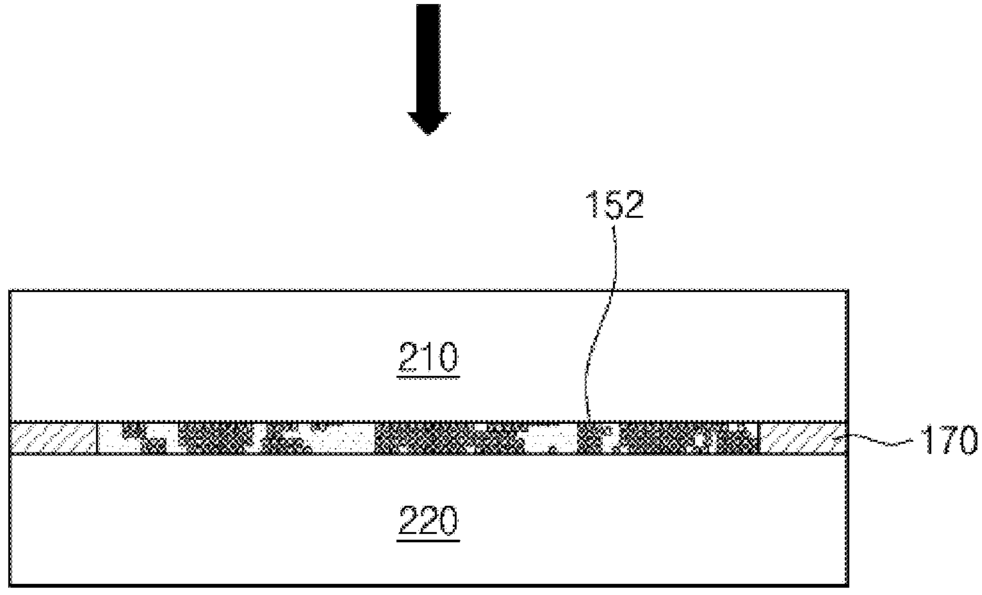

Fig. 9
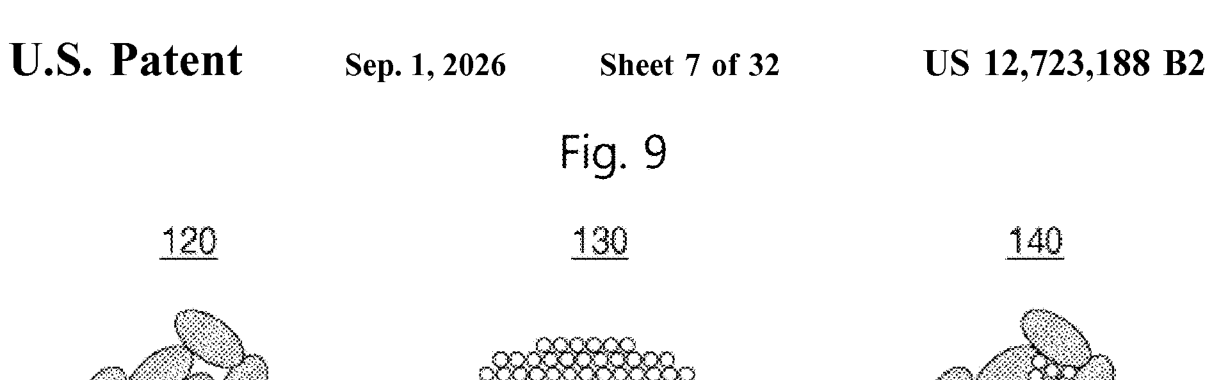
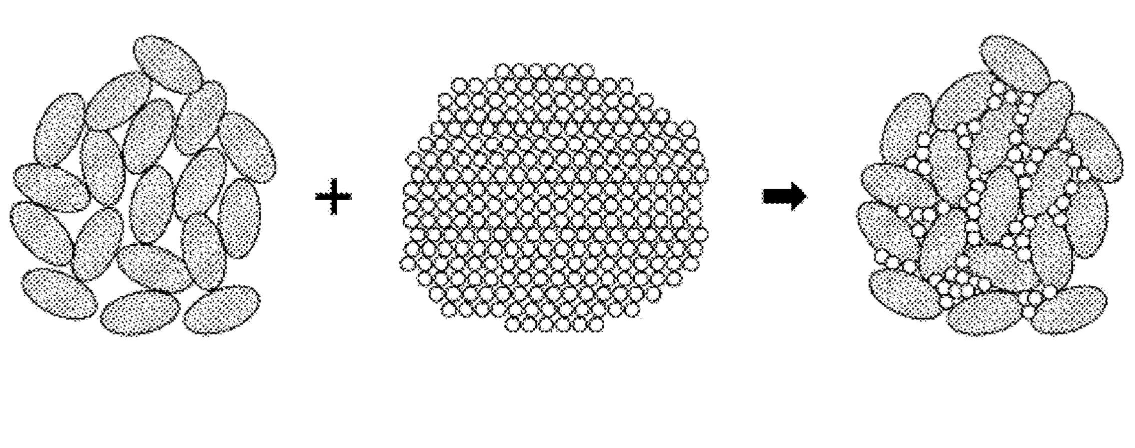
Fig. 10
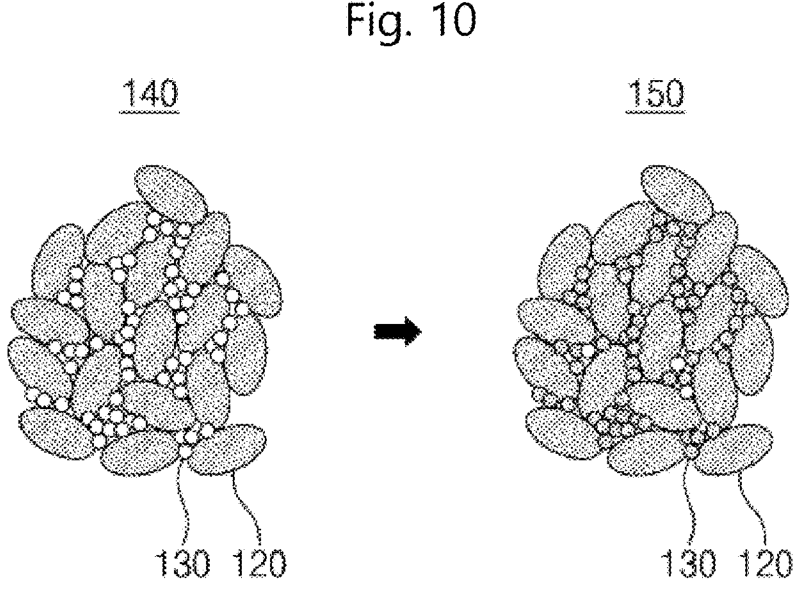

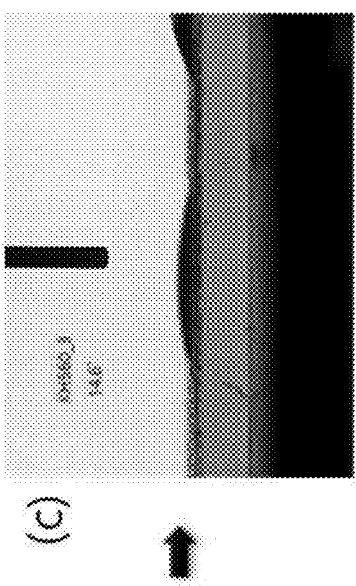
(c)
(b)
Fig. 14
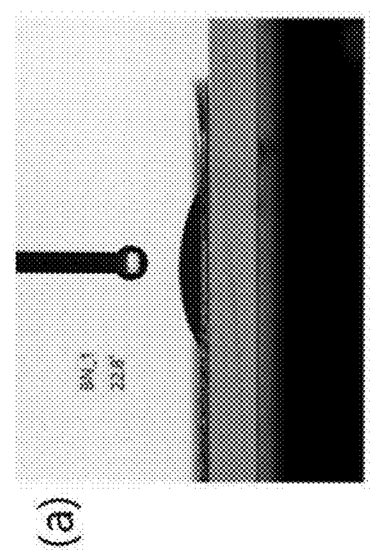
(a)

| EXPERIMENTAL EXAMPLE 3-4 (400~450L/h) | EXPERIMENTAL EXAMPLE 3-3 (450~500L/h) | EXPERIMENTAL EXAMPLE 3-2 (500~550L/h) | EXPERIMENTAL EXAMPLE 3-1 (550~600L/h) |
|---|---|---|---|

Fig. 22
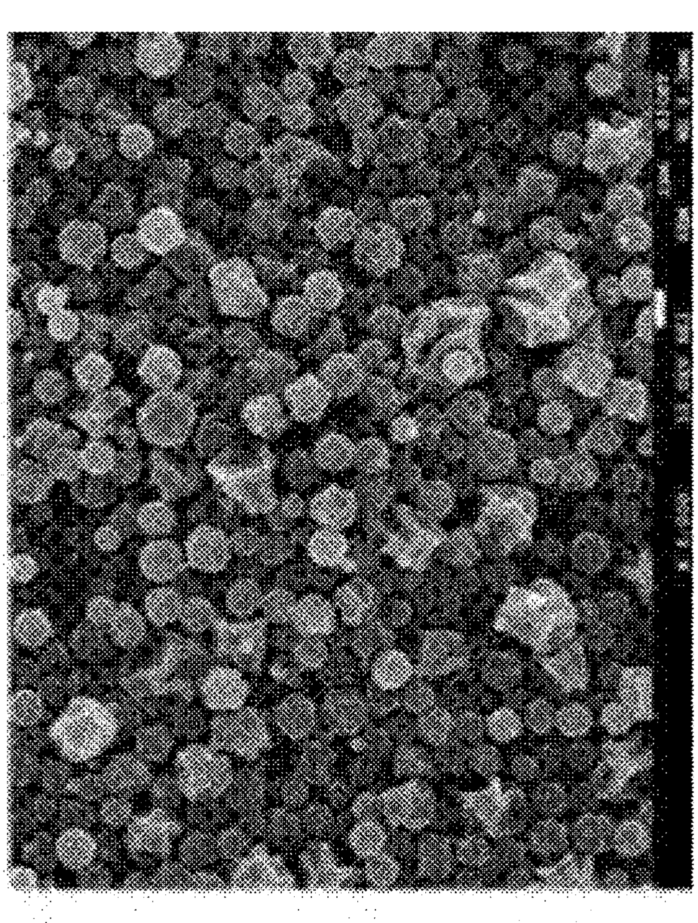
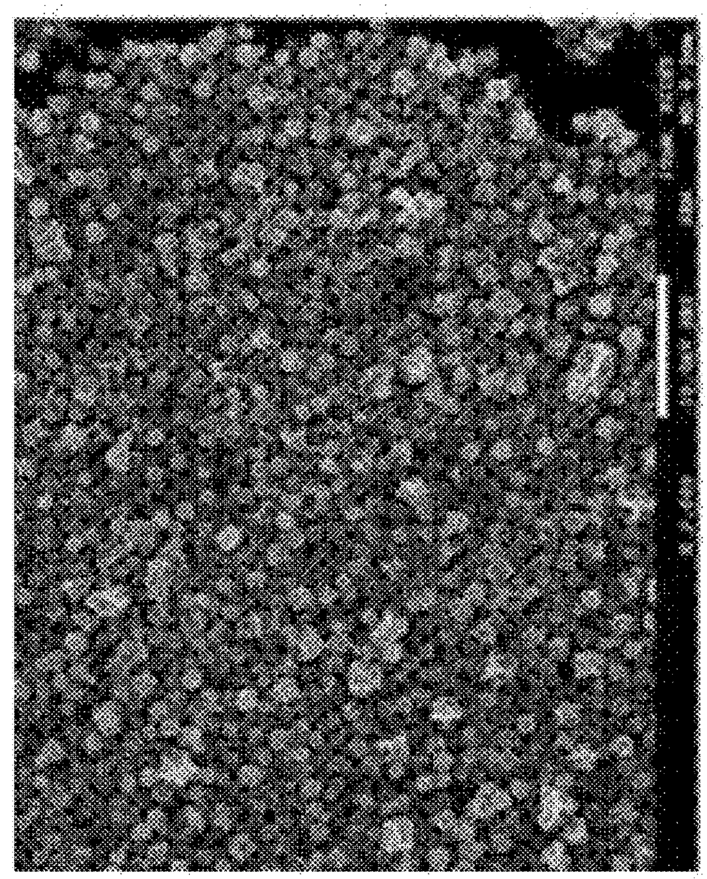

Fig. 23
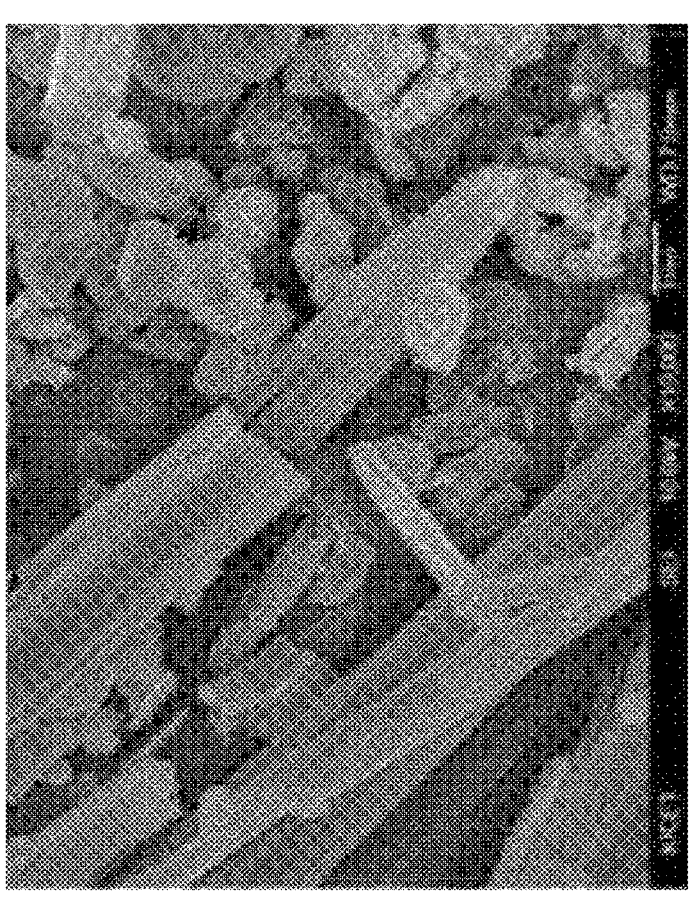
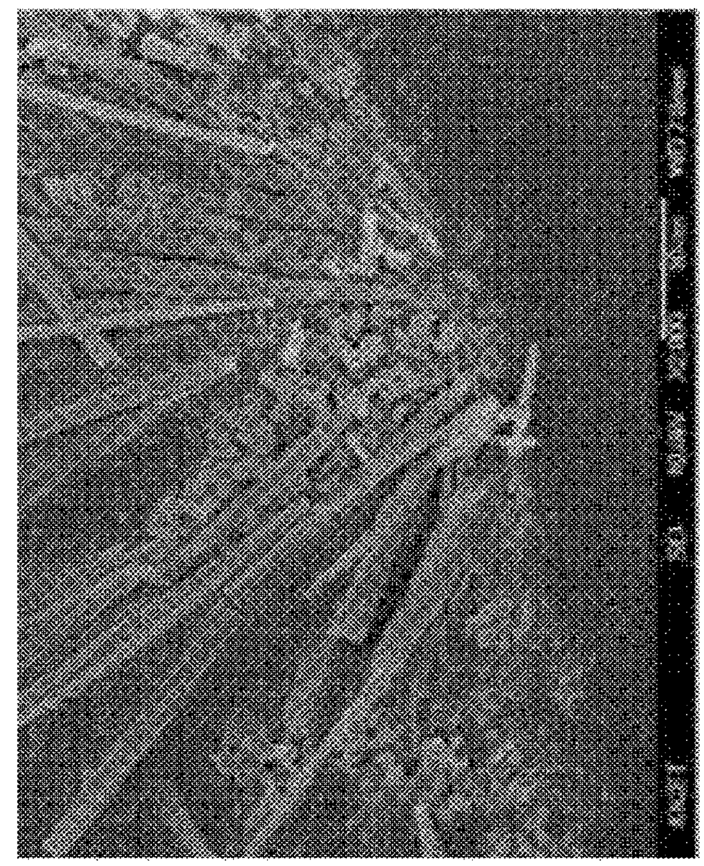

Fig. 25
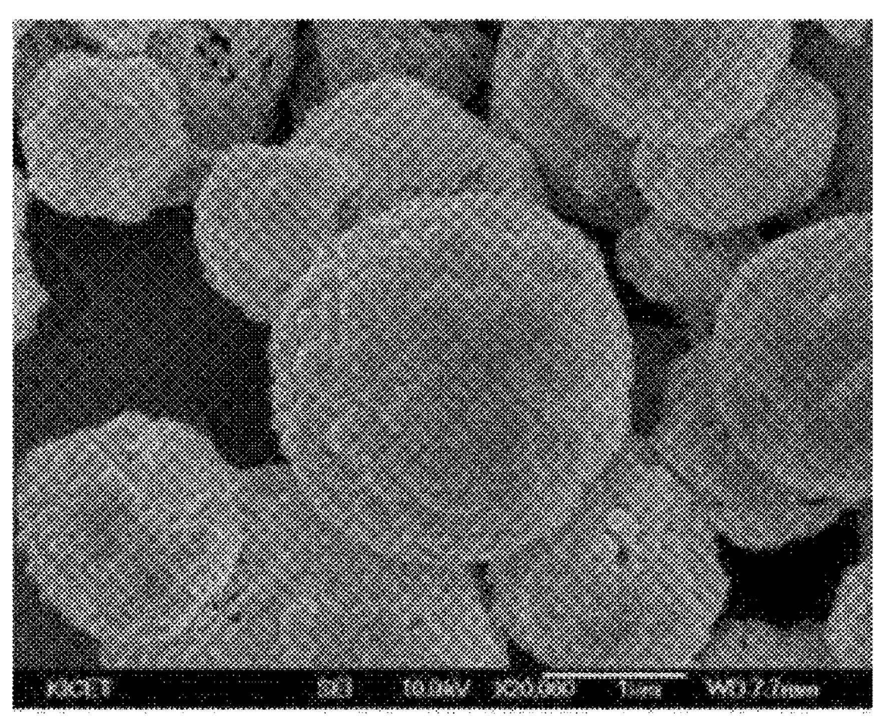
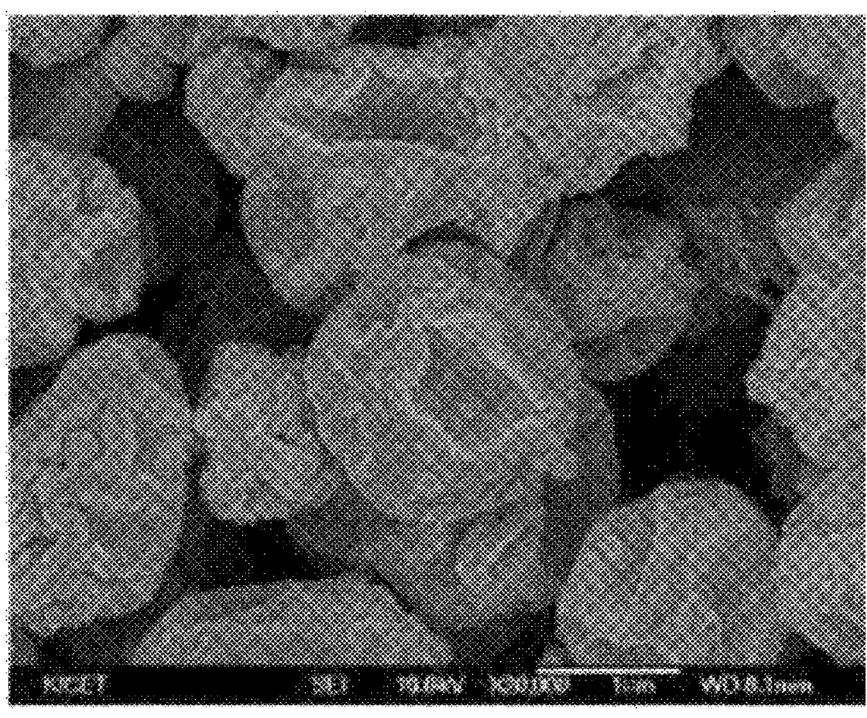

Fig. 26
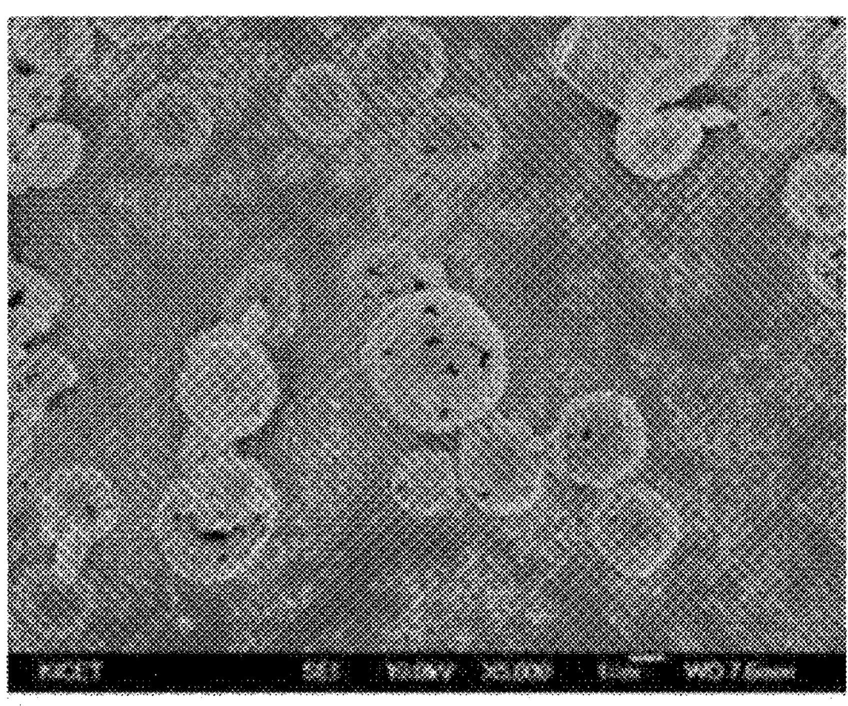
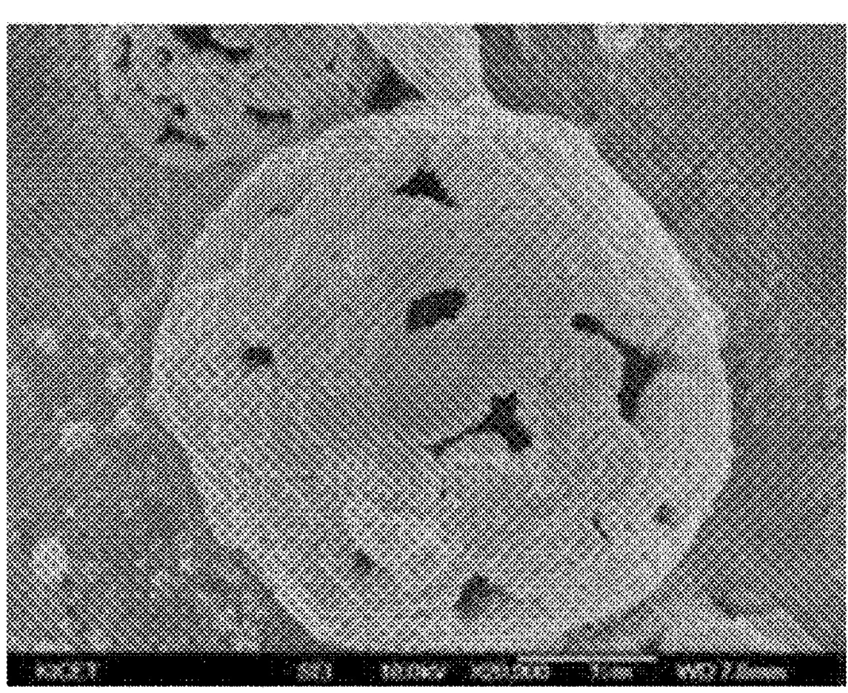

Fig. 27
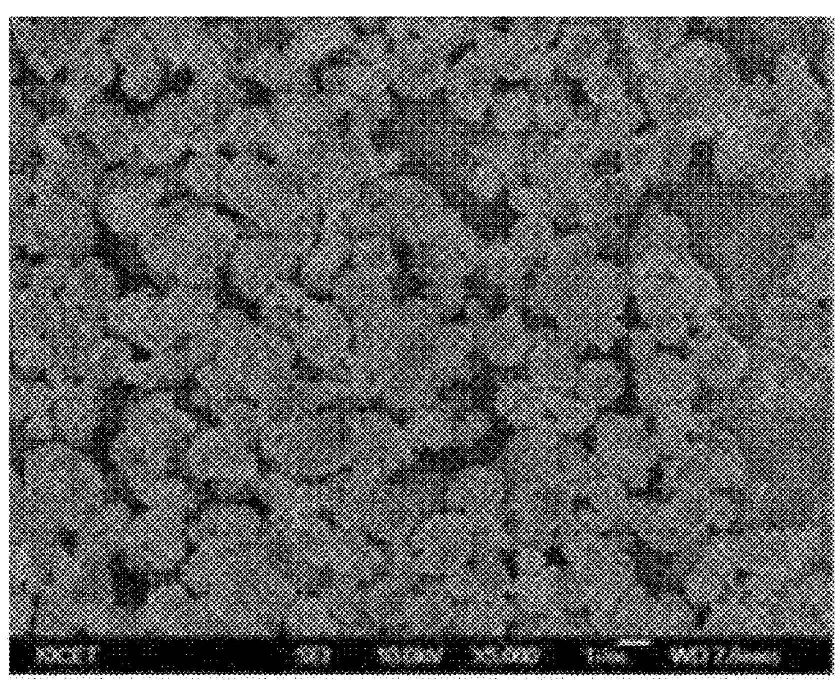
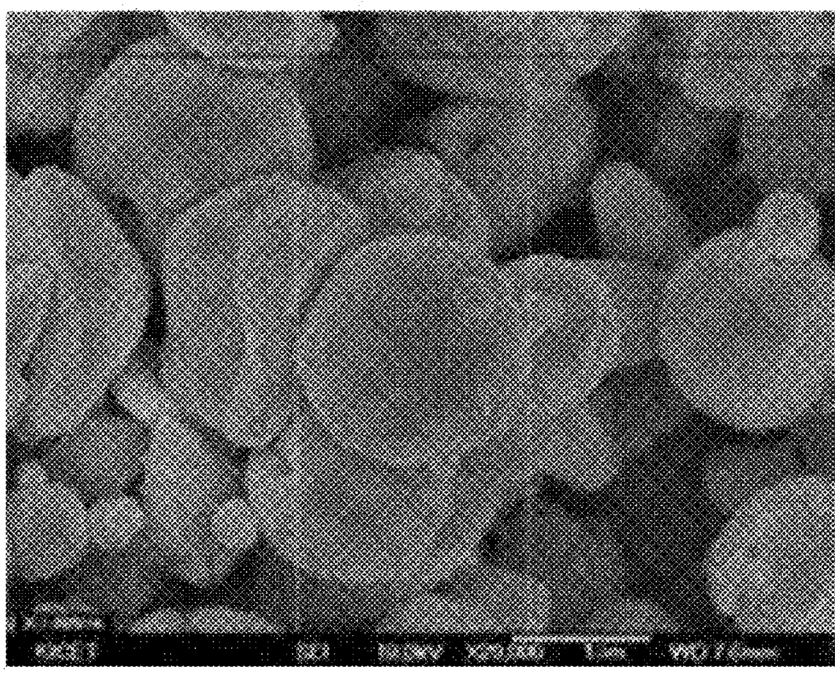

MD 1
min
0
5
10
15
20
25
30
Volume Frequency (%)
100
80
60
40
20
0
1
10
Diameter(um)

Fig. 37
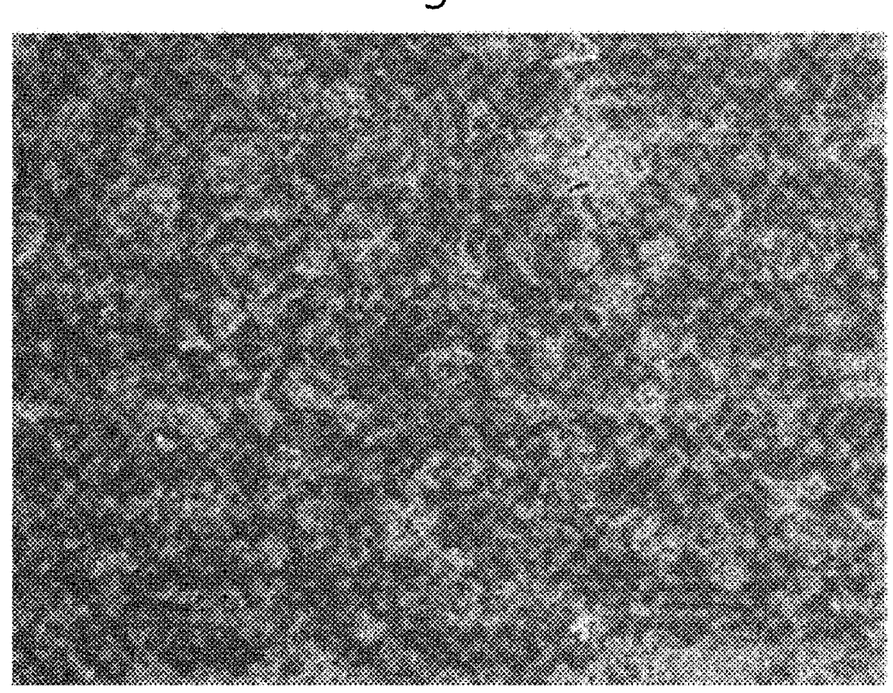
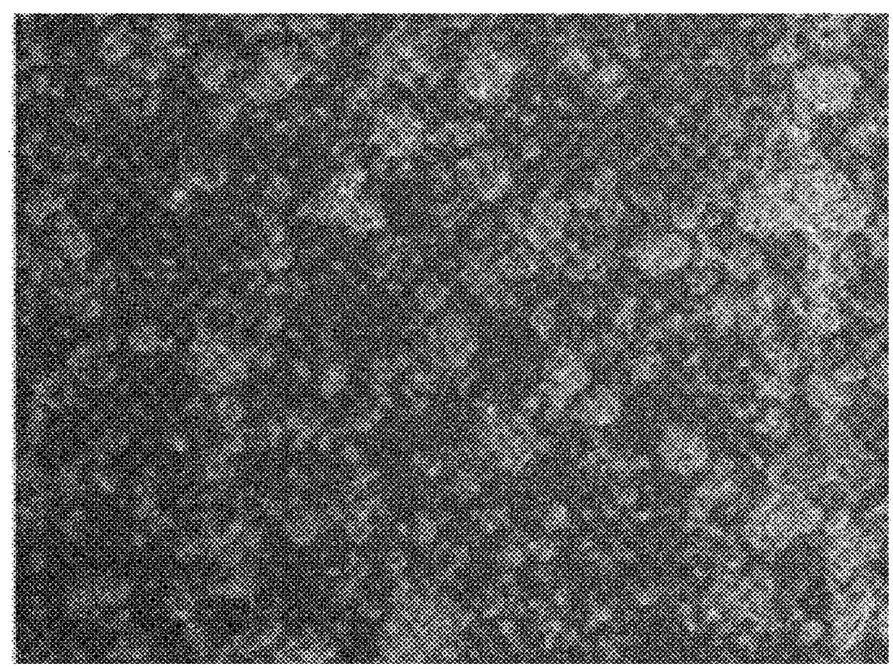

HEAT DISSIPATION MATERIAL, COMPOSITION INCLUDING SAME, AND PREPARATION METHOD THEREFOR

CROSS REFERENCE TO RELATED APPLICATIONS

This is a continuation of PCT/KR2022/016099 (filed 21 Oct. 2022), which claims the benefit of Republic of Korea Patent Application KR 10-2022-0135470 (filed 20 Oct. 2022), Republic of Korea Patent Application KR 10-2022-0121905 (filed 26 Sep. 2022), and Republic of Korea Patent Application KR 10-2021-0184508 (filed 22 Dec. 2021). The entire disclosure of each of these priority applications is hereby incorporated by reference herein.

TECHNICAL FIELD

The present application relates to a heat dissipation material, a composition including the same, and a method for producing the same, and more specifically, to a heat dissipation material including secondary particles in which a plurality of primary particles are aggregated, a composition including the same, and a method for producing the same.

The present invention was derived as a result from the national research and development business as follows.

Project Unique Number: 1711155761

Project Number: 2020M3H4A3106409

Related Department: Ministry of Science and ICT

Project Management (Specialized) Agency: Research Foundation of Korea

Research Business Title: Technology Development for Nano and Materials (R&D)

Research Project Title: Development of High Thermal Conductivity Filler Material for Micro LED Multi-Functional Bonding Material Contribution Rate: 1/1

Lead Institute: Korea Institute of Ceramic Engineering And Technology

Research Period: Jan. 1, 2022-Dec. 31, 2022

Total Research Period: Aug. 24, 2020-Dec. 31, 2024

BACKGROUND ART

As the sizes of various electronic devices including components, which have high power consumption and generate a lot of heat, such as micro LEDs and power devices are reduced, it is an important issue to maintain the temperature by dissipating the generated heat to the outside.

In order to effectively dissipate the heat, a heat dissipation technology is being applied to a metal substrate-based high heat dissipation circuit substrate or the like, which has excellent thermal conductivity, but there is a limitation to the thermal conductivity of an electronic device which generates heat and a polymer-based bonding layer which connects a component and an external heat dissipation component.

In order to achieve high thermal conductivity of a polymer composite material, a large amount of fillers is required, and in this case, processing conditions may be difficult and physical properties of the product may be deteriorated.

Thermal conductivity problems occur in various applications, such as polymer-based bonding, a thermal interface material (TIM), encapsulation, underfill, etc., and in order to solve the problems, a composite into which a filler having high thermal conductivity is inserted is used.

Fine adjustment of the size and fraction of the inserted filler is required according to application fields of the composite, for example, in applications such as a 3D NAND memory stack, a micro light emitting device bonding for a display, etc., a composite of 10 um or less, and preferably, 1 to 5 um, may be used according to reduction in thickness, and the filler inside the composite is thus required to have a size of 10 um or less, and preferably, 1 to 5 um.

Main characteristics of the filler included in the composite has high thermal conductivity, a shape (shape that may not interfere with dispersibility and flowability of a polymer), dispersibility in a polymer resin, etc., and various heat dissipation materials for improving such characteristics have been developed.

For example, Korean Unexamined Patent Publication No. 10-2021-0073257 discloses a method for preparing a thermally conductive polymer composite, which includes mixing thermally conductive carbon material powder in a mixed solvent consisting of saturated fatty acids and C1 to C4 alcohol so as to obtain a mixed solution, putting the mixed solution into a wet pelletizer so as to obtain a granular-type master batch, mixing 30 to 60 wt % of the granular-type master batch with 40 to 70 wt % of a thermoplastic resin so as to obtain an extruded and molded product through an extruder, and pelletizing the extruded and molded product.

In another example, Korean Patent Registration Publication No. 10-1797671 discloses a method for producing a silver-carbon nanocomposite for heat dissipation materials, which includes: a first step of mixing a predetermined ratio of graphite powder and silver powder to prepare mixed powder; and a second step of irradiating microwaves to the mixed powder under a predetermined gas atmosphere to form a silver-carbon nanocomposite, wherein before the first step, the method further includes a step of pre-treating the graphite powder using any one method selected from microwave treatment or plasma treatment, wherein in the second step, the microwaves are irradiated, so that the graphite powder is exfoliated, thereby forming graphene, and the graphene reacts with the silver powder to form a silver-carbon nanocomposite having a structure in which silver particles are grown as nanoparticles on a surface of the graphene, wherein the mixed powder is self-heated to a temperature of 400 to 1700° C. by the microwaves irradiated in the second step to form a silver-carbon nanocomposite, and wherein heat diffusivity of the silver-carbon nanocomposite is 140 to 170 $mm^2/S$, and a Vickers hardness thereof is 70 to 140 HV.

DISCLOSURE

Technical Problem

One technical problem to be solved by the present application is to provide a heat dissipation material, a composition including the same, and a method for producing the same.

Another technical problem to be solved by the present application is to provide a heat dissipation material having improved dispersibility and flowability in a polymer resin, and a method for producing the same.

Still another technical problem to be solved by the present application is to provide a heat dissipation material having improved sphericity, and a method for producing the same.

Still another technical problem to be solved by the present application is to provide a heat dissipation material having increased heat transfer paths, and a method for producing the same.

Still another technical problem to be solved by the present application is to provide a heat dissipation material having a simple manufacturing process and easy mass production, and a method for producing the same.

Still another technical problem to be solved by the present application is to provide a heat dissipation material having secondary particles in which primary particles on the scale of a few micrometers (ex. 1~5 um) are aggregated, and a method for producing the same.

Still another technical problem to be solved by the present application is to provide a heat dissipation material having secondary particles aggregated using functionalized primary particles, and a method for producing the same.

Still another technical problem to be solved by the present application is to provide a heat dissipation material capable of improving a filling rate, and a method for producing the same.

Still another technical problem to be solved by the present application is to provide a heat dissipation material having improved thermal conductivity, and a method for producing the same.

Still another technical problem to be solved by the present application is to provide a method for producing a heat dissipation material capable of reducing a sintering temperature.

The technical problems to be solved by the present application are not limited to those described above.

Technical Solution

In order to solve the technical problems, the present invention provides a method for producing a heat dissipation material.

According to one embodiment, the method for manufacturing a heat dissipation material may include: preparing primary particles; producing a dispersion solution by mixing the primary particles, a binder, a dispersant, and a solvent; producing a base source by adding a boron source and a nitrogen source to the dispersion solution and dissolving the boron source and the nitrogen source; producing droplets by spraying the base source, and drying the droplets to produce preliminary secondary particles including primary aggregated particles in which a plurality of primary particles are aggregated and intermediate particles in which the boron source and the nitrogen are reacted; and producing secondary particles by sintering the preliminary secondary particles, and mixing a plurality of secondary particles with a polymer resin to produce a heat dissipation material, wherein the solvent includes at least one of pure water, ultrapure water, chloroform, chlorobenzene, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ether, diethyl ether, dimethoxymethane, N,N-dimethylformamide, ethanol, ethylamine, ethylbenzene, ethylene glycol ether, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene), m-xylene, o-xylene, p-xylene, 1,2-dichlorobenzene, 1,3-dichlorobenzene, 1,4-dichlorobenzene, or methyl pyrrolidone.

According to one embodiment, in the producing of the base source, a ratio of the boron source to the nitrogen source (boron source:nitrogen source) added to the dispersion solution may be controlled to be equal to or greater than 7:1 and equal to or less than 14:1.

According to one embodiment, the secondary particles may be produced by sintering the preliminary secondary particles at a temperature of 1100° C. or higher and lower than 1500° C.

According to one embodiment, in a process of producing the secondary particles, as the preliminary secondary particles are sintered, the intermediate particle may be formed to have a phase identical to a phase of the primary aggregated particle.

According to one embodiment, the method for producing a heat dissipation material may further include substituting a nitrogen group present on a surface of the primary particle with a first functional group by surface-treating the primary particles after the producing of the primary particles and before the producing of the dispersion solution.

In order to solve the technical problems, the present invention provides a method for producing a thermal interface layer.

According to one embodiment, the method for producing a thermal interface layer may include: preparing the heat dissipation material produced according to the embodiment; and providing the heat dissipation material and applying a pressure in order to produce the thermal interface layer using the heat dissipation material, and compressing a plurality of secondary particles with a load exceeding a compressive strength of the secondary particles.

According to one embodiment, at least a portion of the plurality of secondary particles may be collapsed and fragmented into a plurality of pieces, and a plurality of uncollapsed secondary particles and the plurality of pieces may coexist while being mixed with each other in the thermal interface layer.

In order to solve the technical problems, the present invention provides a heat dissipation material.

According to one embodiment, the heat dissipation material having a filler including secondary particles in which primary particles are aggregated, wherein the filler forms a thermal interface layer for thermal conduction between a heat generation part and a heat absorption part, wherein the filler includes at least one of boron nitride (BN), carbon (C), silicon carbide (SiC), diamond, beryllium oxide (BeO), boron phosphide (BP), aluminum nitride (AlN), beryllium sulfide (BeS), boron arsenide (BAs), silicon (Si), gallium nitride (GaN), aluminum phosphide (AlP), or gallium phosphide (GaP), and wherein the primary particle has a shape of at least one of a nanoparticle, a nanotube, a nanoflake, a nanoneedle, a nanofiber, a nanodot, a nanosheet, a nanoribbon, a nanoplate, a nanosphere, a nanohorn, a nanocone, or a nanoscroll.

According to one embodiment, the secondary particle may include primary aggregated particles in which a plurality of primary particles are aggregated, and intermediate particles disposed between the plurality of primary aggregated particles.

According to one embodiment, the primary particle may include boron nitride having a hexagonal crystal structure, and the primary aggregated particles may be aggregates of a plurality of boron nitrides having a hexagonal crystal structure, and may have a sphere shape.

According to one embodiment, the intermediate particle may have a phase identical to a phase of the primary aggregated particle, and may have a sphere shape.

According to one embodiment, the secondary particle may have a BET specific surface area that decreases as a content of the intermediate particles increases relative to a content the primary particles.

According to one embodiment, in XRD analysis of the secondary particles, a fraction of a secondary phase and a phase of a heterogeneous material may be 1% or less.

According to one embodiment, when the secondary particles are dispersed in water and treated with ultrasonic waves under conditions of 20 KHz and 200 W, a maximum particle size peak thereof may be maintained at greater than 60%.

In order to solve the technical problems, the present invention provides a heat dissipation composition.

According to one embodiment, the heat dissipation composition may include: a polymer resin matrix; and a first filler mixed with the polymer resin matrix, wherein the first filler includes secondary particles in which a plurality of primary particles are aggregated, wherein the polymer resin matrix includes at least one of a thermoplastic resin or a thermosetting resin, wherein the first filler is a heat dissipation material, and includes at least one of boron nitride (BN), carbon (C), silicon carbide (SiC), diamond, beryllium oxide (BeO), boron phosphide (BP), aluminum nitride (AlN), beryllium sulfide (BeS), boron arsenide (BAs), silicon (Si), gallium nitride (GaN), aluminum phosphide (AlP), or gallium phosphide (GaP), wherein the primary particle has a shape of at least one of a nanoparticle, a nanotube, a nanoflake, a nanoneedle, a nanofiber, a nanodot, a nanosheet, a nanoribbon, a nanoplate, a nanosphere, a nanohorn, a nanocone, or a nanoscroll, and wherein the polymer resin includes at least one of an epoxy resin, a urethane resin, a polyimide resin, nylon, polyisoprene, polydicyclopentadiene, polytetrafluoroethylene, polyphenylene sulfide, polyphenylene oxide, silicon, polyketone, aramid, cellulose, polyimide, rayon, polymethyl methacrylate, polyvinylidene chloride, polyvinylidene fluoride, polyurethane, polyisobutylene, polychloroprene, polybutadiene, polypropylene, polyvinyl chloride, polyvinyl acetate, polystyrene, polyester, polyvinyl pyrrolidone, polycyanoacrylate, polyacrylonitrile, polyamide, polyarylene ethynylene, polyphenylene ethynylene, polythiophene, polyaniline, polypyrrole, polybutylene terephthalate, polyethylene terephthalate, aromatic polyamide, polyamide, polycarbonate, polystyrene, polyphenylene sulfide, polysulfone, polyethersulfone, polyetherimide, polyetheretherketone, polyarylate, polymethylmethylacrylate, polyvinyl alcohol, polypropylene, polyethylene, poly(acrylonitrile-butadiene-styrene), or a poly(styrene-butadiene-styrene) copolymer.

According to one embodiment, the secondary particle may include primary aggregated particles in which a plurality of primary particles are aggregated, and intermediate particles disposed between the plurality of primary aggregated particles.

According to one embodiment, the secondary particle may have a size of 1 to 10 um, and the secondary particle has a BET specific surface area of less than 20 $m^2/g$.

According to one embodiment, the first filler may be configured to have 10 to 80 vol %.

According to one embodiment, the heat dissipation material may further include a second filler in addition to the first filler, wherein the second filler includes at least one of carbon, carbon black, CNT, graphite, aluminum flake, magnesium oxide, aluminum nitride, copper, boric anhydride, magnesium carbonate, zinc oxide, silicon oxide, aluminum oxide, stainless steel, silicon carbide, yttrium(III) oxide, boron oxide, or zirconium oxide.

Advantageous Effects

According to the method for producing a heat dissipation material according to the embodiment of the present application, primarily particles, a binder, and a solvent may be mixed to produce a dispersion solution, a boron source and a nitrogen source may be added to the dispersion solution and dissolved to produce a base source, the base source may be sprayed to produce droplets, and the droplets may be dried to produce preliminary secondary particles including primary aggregated particles in which a plurality of primary particles are aggregated and intermediate particles in which the boron source and the nitrogen source are reacted, and the preliminary secondary particles may be sintered to produce secondary particles.

Before producing the base source, a first functional group may be bound to a surface of the primary particle, and due to the binding of the first functional group, the primary particle may have a high degree of dispersion in the source solution, and thus, sphericity of the secondary particles produced using the droplets of the source solution may be improved, and sintering of the secondary particles may be promoted.

In addition, the sphericity of the secondary particles is improved, so that the secondary particles may have high flowability and dispersibility in the polymer resin, thereby improving a filling rate of the secondary particles in the polymer resin matrix.

In addition, a sintering temperature for producing the secondary particles may be reduced by the intermediate particles.

In addition, in a process of producing the thermal interface layer using the secondary particles, the secondary particles may be collapsed. Accordingly, the uncollapsed secondary particles and the plurality of pieces generated by the collapse of the secondary particles may coexist while being mixed, and thus the heat transfer path may be expanded, the filling rate in the thermal interface layer may be improved, and an interface of the device may be prevented from being damaged due to contact with the secondary particles.

DESCRIPTION OF DRAWINGS

FIG. 1 is a flowchart for explaining a method for producing a heat dissipation material according to Example 1 of the present application.

FIGS. 5 and 6 are views for explaining a process of producing a thermal interface layer using the heat dissipation material produced according to the method for producing a heat dissipation material according to Example 1 of the present application.

FIG. 7 is a view for explaining a process of producing a thermal interface layer using the heat dissipation material produced according to the method for producing a heat dissipation material according to a modified example of Example 1 of the present application.

FIGS. 9 and 10 are views for explaining a method for producing a heat dissipation material according to Example 2 of the present application.

FIG. 14 is a photograph of a contact angle which is measured according to a surface treatment of the secondary particles produced according to Experimental Example 1 of the present application.

FIG. 22 shows SEM photographs of secondary particles produced according to Experimental Example 5 of the present application.

FIG. 23 shows SEM photographs of crystalline shapes of general melamine diborate.

FIGS. 24 and 25 are SEM photographs of secondary particles according to Experimental Example 5, which are produced by varying a mixing ratio of boric acid and melamine.

FIG. 26 shows SEM photographs of boric acid formed in a process of producing secondary particles according to Experimental Example 5 of the present application.

FIG. 27 shows SEM photographs of melamine formed in the process of producing secondary particles according to Experimental Example 5 of the present application.

FIG. 29 is a view for explaining XRD characteristics of the secondary particles according to Experimental Example 6 of the present application.

FIG. 30 is a view for explaining a BET specific surface area of the secondary particles according to Experimental Example 6 of the present application.

Figure 33:
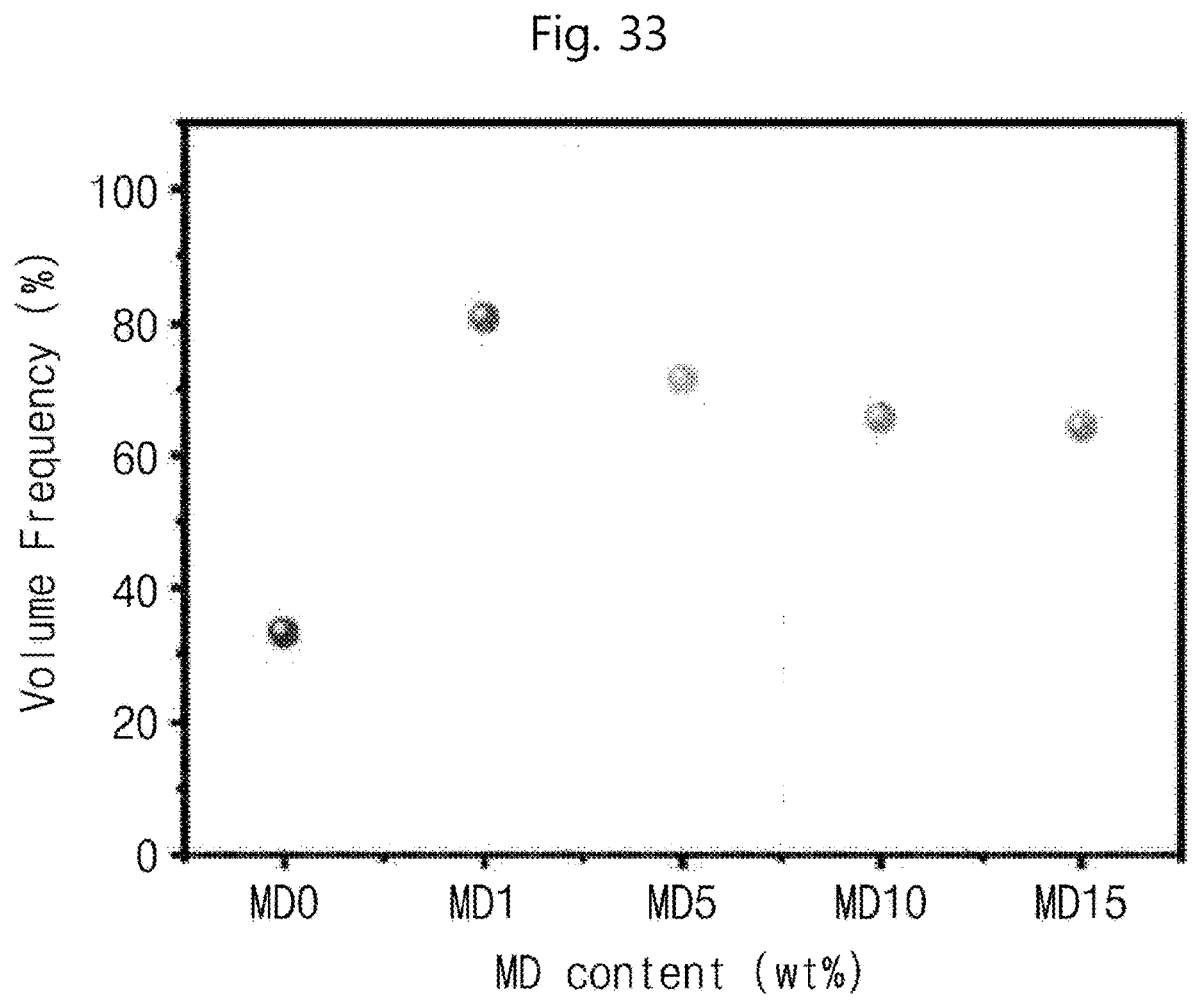
Figure 35:
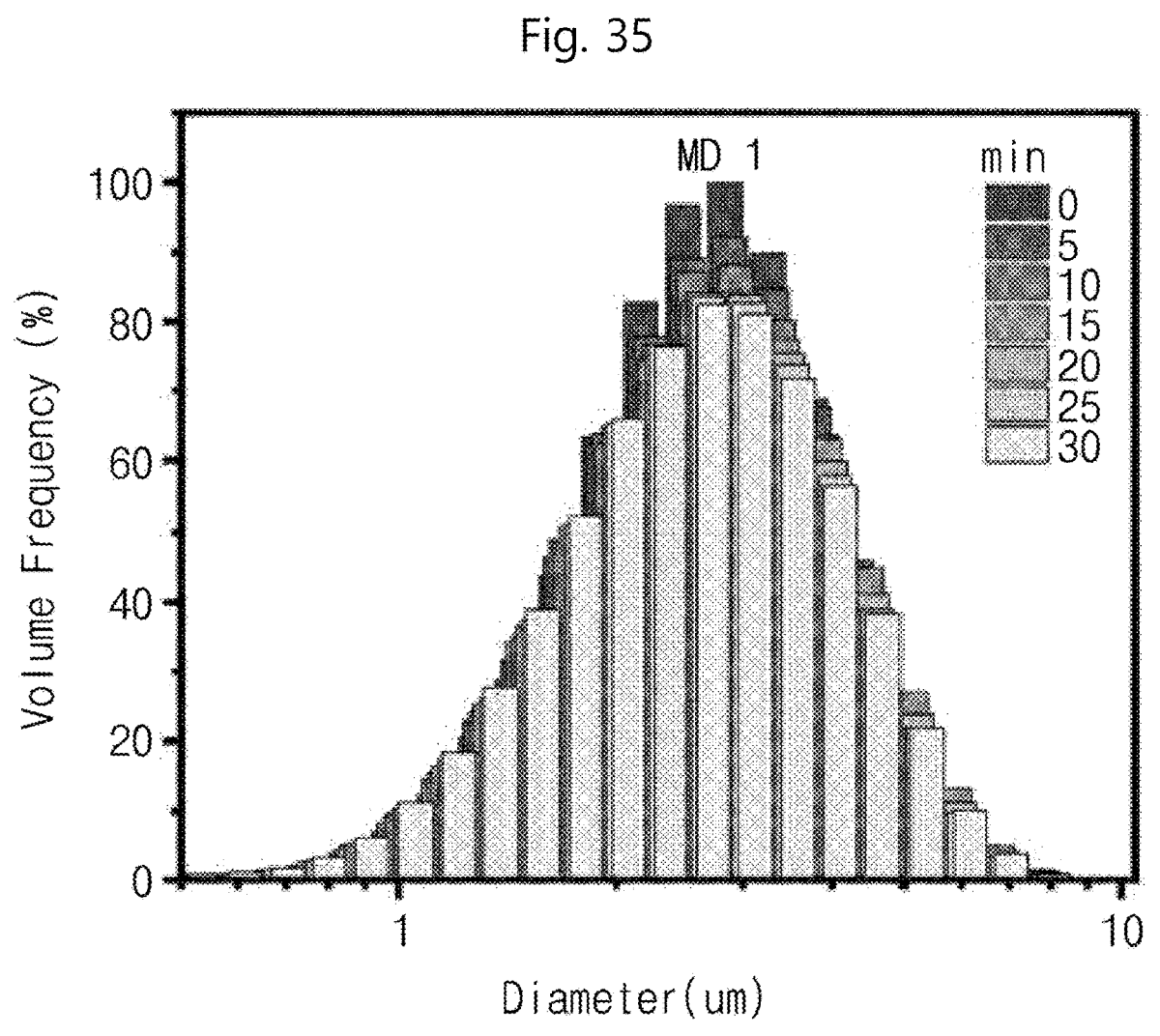

FIGS. 32 to 35 are views for explaining PSA characteristics relative to ultrasonic impact of the secondary particles according to Experimental Example 6 of the present application.

FIG. 37 is an SEM photograph of a state in which secondary particles are dispersed in the epoxy resin according to Experimental Example 6 of the present application.

MODE FOR INVENTION

Figure 2:
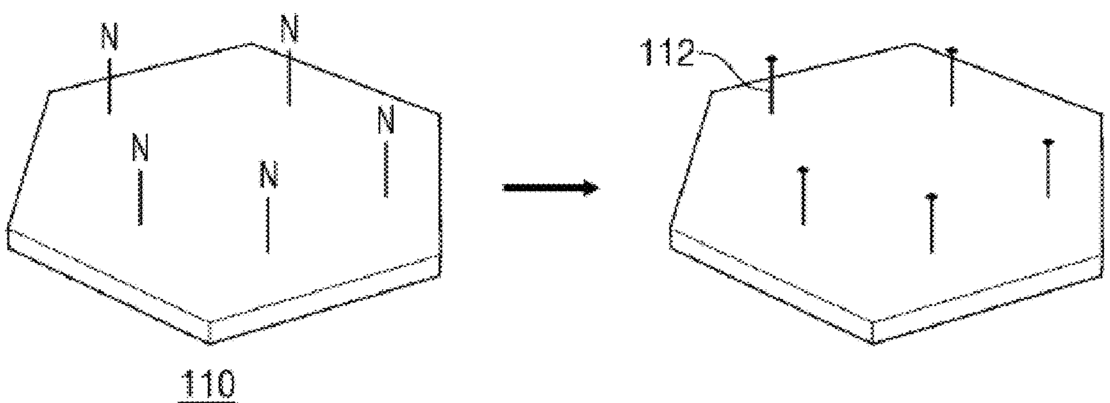
FIGS. 2 and 3 are views for explaining a surface treatment process of a heat dissipation material according to Example 1 of the present application.

Hereinafter, preferred embodiments of the present invention will be described in detail with reference to the accompanying drawings. However, the present invention may be embodied in different forms and should not be construed as limited to the embodiments set forth herein. Rather, the embodiments are provided so that this disclosure will be thorough and complete, and will fully convey the scope of the present invention to those skilled in the art.

In the present specification, it will be understood that when an element is referred to as being "on" another element, it can be formed directly on the other element or intervening elements may be present. In the drawings, the thicknesses of layers and regions are exaggerated for clarity.

In addition, it will be also understood that although the terms first, second, third, etc. may be used herein to describe various elements, these elements should not be limited by these terms. Thus, a first element in some embodiments may be termed a second element in other embodiments without departing from the teachings of the present invention.

Embodiments explained and illustrated herein include their complementary counterparts. As used herein, the term "and/or" includes any and all combinations of one or more of the associated listed elements.

The singular expression also includes the plural meaning as long as it does not differently mean in the context. In addition, the terms "comprise", "have" etc., of the description are used to indicate that there are features, numbers, steps, elements, or combination thereof, and they should not exclude the possibilities of combination or addition of one or more features, numbers, operations, elements, or a combination thereof.

In addition, when detailed descriptions of related known functions or constitutions are considered to unnecessarily cloud the gist of the present invention in describing the present invention below, the detailed descriptions will not be included.

Figure 3:
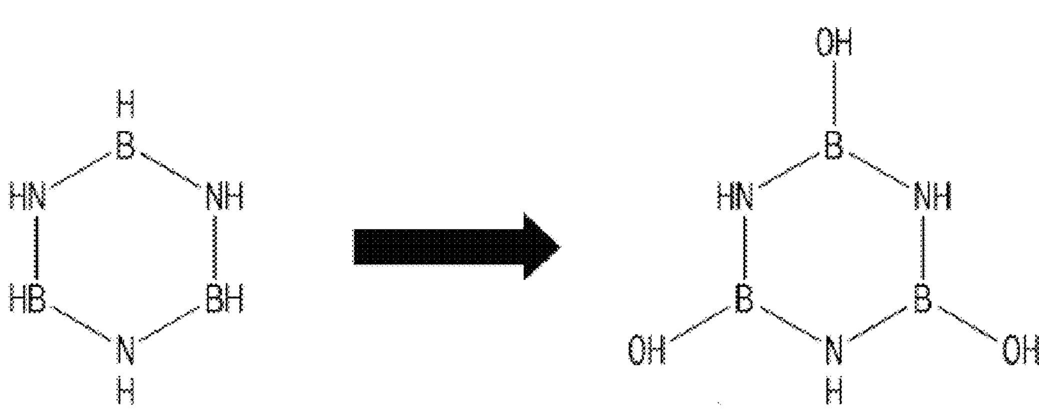
Figure 4:
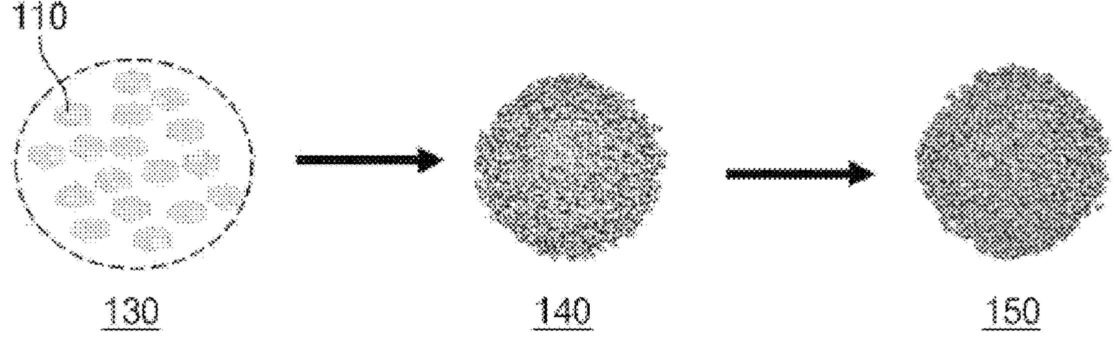
FIG. 4 is a view for explaining a method for producing a heat dissipation material according to Example 1 of the present application.

FIG. 1 is a flowchart for explaining a method for producing a heat dissipation material according to Example 1 of the present application, FIGS. 2 and 3 are views for explaining a surface treatment process of a heat dissipation material according to Example 1 of the present application, and FIG. 4 is a view for explaining a method for producing a heat dissipation material according to Example 1 of the present application.

Referring to FIGS. 1 to 4, primary particles 110 are prepared (S110).

According to one embodiment, the primary particle 110 may be boron nitride (BN) having a hexagonal crystal structure. Alternatively, according to another embodiment, the primary particle 110 may be at least one of carbon (C), silicon carbide (SiC), diamond, beryllium oxide (BeO), boron phosphide (BP), aluminum nitride (AlN), beryllium sulfide (BeS), boron arsenide (BAs), silicon (Si), gallium nitride (GaN), aluminum phosphide (AlP), or gallium phosphide (GaP).

In addition, according to one embodiment, the primary particle 110 may have a flake and/or plate shape as shown in FIG. 2.

Alternatively, according to another embodiment, the primary particle 110 may have a shape of at least one of a nanoparticle, a nanotube, a nanoflake, a nanoneedle, a nanofiber, a nanodot, a nanosheet, a nanoribbon, a nanoplate, a nanosphere, a nanohorn, a nanocone, or a nanoscroll.

As described above, when the primary particle 110 is boron nitride having a hexagonal crystalline structure, the primary particle 110 may be provided in a state of being exfoliated from bulk-type boron nitride.

As described below, a plurality of primary particles 110 may be aggregated to form secondary particles 150. In this case, as a size of the primary particle 110 decreases, sphericity of the secondary particle 150 may be improved, and thus flowability and dispersibility of the secondary particle 150 in the polymer resin may be improved. In contrast, when the size of the primary particle 110 is excessively small, an interface between the primary particles 110 may act as resistance of heat transfer, thereby deteriorating thermal conduction characteristics.

According to one embodiment of the present application, the secondary particle 150 may have a size of 1 to 10 um or a size of 1 to 5 um, and the primary particle 110 may have a size of 1 to 10% compared to the size of the secondary particle 150 in at least two axes among three axes, or in directions of all the three axes. Specifically, for example, the primary particle 110 may have a thickness of about 10 nm or less and a size of about 70 nm in a plane direction, or may have a thickness of about 30 nm or less and a size of about 200 nm in the plane direction.

According to one embodiment, a surface treatment may be performed on the primary particles 110. As described above, for example, when the primary particle 110 is boron nitride, a plurality of nitrogen groups (N-terminations) may be provided on a surface of the primary particle 100 as shown in FIG. 2. In this case, the nitrogen group on the surface of the primary particle 110 may be substituted with a first functional group 112 by a surface treatment process. For example, the first functional group 112 may be a hydroxyl group (OH), and a process of substituting the nitrogen group with the first functional group 112 may be performed by a method for immersing the primary particles 110 in a basic solution (for example, NaOH), and then drying the same.

Alternatively, according to another embodiment, the nitrogen group may be substituted with the first functional group 122 (hydroxyl group) by a method for heat-treating (for example, 1,000° C.) the primary particles 110 in the air, immersing the primary particles 110 in an acidic solution (for example, a sulfuric acid, a nitric acid, a phosphoric acid, etc.), immersing the primary particles 110 in a basic solution (for example, NaOH, KOH, etc), and then oxidizing the primary particles 110 with an oxidizing agent (for example, $KMnO_4$, $H_2O_2$, etc).

Alternatively, unlike the above description, according to another embodiment, the first functional group 112 substituting the nitrogen group on the surface of the primary particle 110 may be a hydrogen group (—H). In this case, a thiol molecule such as epoxy thiol may be used instead of epoxy silane described below.

Specifically, as shown in FIG. 3, at least some of ends of the nitrogen group of the boron nitride may be substituted with the first functional group 112 (hydroxyl group).

If unlike the above description, a large amount of nitrogen groups are present on the surface of the primary particle 110 because the surface treatment is not performed on the primary particles 110, the primary particles 110 may be aggregated with each other in the source solution produced using the primary particles 110, so that the degree of dispersion may be deteriorated, thereby deteriorating sphericity of the secondary particles 150 that are formed by aggregation of the primary particles 110. Furthermore, sintering may not proceed smoothly in a subsequent sintering process.

Meanwhile, as described above, according to an embodiment of the present application, the nitrogen group on the surface of the primary particle 110 may be substituted with the first functional group 112 (for example, a hydroxyl group) through a surface treatment process. Accordingly, the primary particles 110 may have high dispersibility in the source solution, and therefore, sphericity of the secondary particles 150 formed by aggregation of the primary particles 110 may be increased, and the sintering process may be promoted by the first functional group 112 in a subsequent sintering process.

After the surface treatment process for the primary particles 110 is completed, a source solution may be produced by mixing the primary particles 110, a binder, a dispersant, and a solvent (S120).

For example, the binder may be polyvinyl alcohol. Alternatively, as another example, the binder may include at least one of polyethylene glycol (PEG), methyl cellulose (MC), polyacrylic acid (PAA), polyacrylonitrile, or polyacrylamide.

For example, the dispersant may be an ammonium polymethacrylate aqueous solution. Alternatively, as another example, the dispersant may include at least one of a polycarboxylic acid-based dispersant (acrylic acid-based dispersant, a methacrylic acid-based dispersant, and a copolymer dispersant), a phosphate dispersant, a phosphate complex-based dispersant, an aryl sulfonic acid dispersant, and an amine-based dispersant. Specifically, the dispersant may include an inorganic dispersant including at least one of calcium phosphate salt, magnesium salt, hydrophilic silica, hydrophobic silica, or colloidal silica, may include a nonionic polymer dispersant including at least one of polyoxyethylene alkylether, polyoxyalkylene alkylphenol ether, sorbitan fatty acid ester, polyoxyalkylene fatty acid ester, glycerin fatty acid ester, polyvinyl alcohol, alkyl cellulose, or polyvinyl pyrrolidone, or may include an ionic polymer dispersant including at least one of polyacrylamide, polyvinylamine, polyvinylamine N-oxide, polyvinylammonium salt, polydialkyldiallylammonium salt, polyacrylic acid, polystyrene sulfonic acid, polyacrylic salt, polysulfonic acid, or polyaminoalkylacrylic acid.

For example, the solvent may be pure water or ultrapure water. Alternatively, as another example, the solvent may include at least one of chloroform, chlorobenzene, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ether, diethyl ether, dimethoxymethane, N,N-dimethylformamide, ethanol, ethylamine, ethylbenzene, ethylene glycol ether, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene), m-xylene, o-xylene, p-xylene, 1,2-dichlorobenzene, 1,3-dichlorobenzene, 1,4-dichlorobenzene, or methyl pyrrolidone.

Alternatively, as another example, the solvent is a non-aqueous dispersant (solvent-based dispersant), and may include at least one of an alcohol ester-based (glycerin) solvent, a polyether-based solvent, an amine-based solvent, a sulfonic acid-based solvent, or a cation-based solvent. Specifically, the solvent may include at least one of fatty acid salt, alkylsulfonate salt, alpha-olefin sulfonate salt, alkanesulfonate salt, alkylbenzenesulfonate salt, sulfosuccinate ester salt, alkylsulfate ester salt, alkylether sulfate ester salt, alkylether carboxylate salt, alpha sulfo fatty acid methyl ester salt, methyltaurate salt, glycerin fatty acid ester, polyglycerin fatty acid ester, sucrose fatty acid ester, sorbitan fatty acid ester, polyoxyethylene sorbitan fatty acid ester, polyoxyethylene alkyl ether, polyoxyethylene alkyl phenyl ether, polyoxyethylene fatty acid ester, fatty acid alkanolamide, or alkyl glucoside.

In the source solution, a proportion of the primary particles 110 may be 1 to 10 wt %, a proportion of the dispersant may be 0.1 to 1 wt %, and a proportion of the binder may be 0.1 to 5 wt %.

The proportions of the primary particles 110, the solvent, and the dispersant in the source solution may be controlled such that a zeta-potential of the source solution may have a maximum value.

Subsequently, referring to FIGS. 1 and 4, droplets 130 may be produced by spraying the source solution, and the droplets 130 may be dried to produce preliminary secondary particles 140 in which the plurality of primary particles 110 are aggregated (S130).

Alternatively, the source solution may be sprayed in the form of the droplets 130 using a spray.

The plurality of the primary particles 110 may be present in the droplet 130, and a size of the preliminary secondary particle 140 may be controlled according to a size of the droplet 130. The droplet 130 may be adjusted to 10 um or less or 3 um or less, and in this case, an average size of the preliminary secondary particles 140 may be about 2 um.

The preliminary secondary particles 140 may be obtained using a centrifuge and then washed.

Subsequently, referring to FIGS. 1 and 4, secondary particles 150 may be produced by sintering the preliminary secondary particles 140, and a heat dissipation material may be produced by mixing the plurality of secondary particles 150 with a polymer resin (S140). That is, the heat dissipation material may include the secondary particles 150 dispersed in a matrix including the polymer resin, in which the preliminary secondary particles 140 are sintered.

The step of sintering the preliminary secondary particles 140 may be performed by a method for heat-treating the preliminary secondary particles 140 under an inert gas atmosphere. For example, the inert gas may be nitrogen gas, and may be sintered at a temperature of 1500° C. or higher for 2 hours or longer.

As described above, the first functional group 112 (for example, a hydroxyl group) may be provided on the surface of the primary particle 110, and thus, the first functional group 112 may act as a sintering aid in a process of sintering the preliminary secondary particles 140. Therefore, the preliminary secondary particles 140 may be easily sintered, and as a result, interfacial bonding properties between the primary particles 110 in the preliminary secondary particles 140 may be improved, thermal conductivity of the secondary particles 150 produced by sintering the preliminary secondary particles 140 may be improved, and a compressive strength of the secondary particles 150 may be improved.

According to one embodiment, the compressive strength of the secondary particles 150 may be controlled according to a temperature at which the preliminary secondary particles 140 are heat-treated. Specifically, as the temperature at which the preliminary secondary particles 140 are heat-treated increases, the compressive strength of the secondary particle 150 may increase. For example, the compressive strength of the secondary particles 150 may be 5 MPa or less, more specifically, for example, 0.2 to 2 MPa.

Accordingly, as will be described later, in the step of producing a thermal interface layer by using the heat dissipation material, at least a portion of the secondary particles 150 may be easily collapsed, and therefore, a plurality of heat transfer paths are formed in the thermal interface layer, thereby improving the thermal conductivity and minimizing damage to a heat transfer layer and a heat absorption layer, which make contact with the thermal interface layer.

Before the secondary particles 150 are mixed with the polymer resin, a step of surface-treating the secondary particle 150 to bind a second functional group to a surface of the secondary particle 150, and a step of immersing the secondary particles 150 in a polymer solution to bind a polymer group to the surface of the secondary particle 150 may be further performed. For example, the second functional group may be a hydroxyl group, and the polymer group may be an epoxy group. In this case, for example, the second functional group may be bounded to the surface of the secondary particle 150 by immersing the secondary particles 150 in a basic solution (for example, NaOH), and the polymer group may be bounded to the surface of the secondary particle 150 by immersing the secondary particles 150 in an epoxy silane solution.

Thereafter, the plurality of secondary particles 150 may be mixed with the polymer resin, thereby producing the heat dissipation material.

The secondary particle 150 produced according to the embodiment of the present application is a filler used together with the polymer resin, and the secondary particle 150 may have a high sphericity (for example, 70% or greater). Accordingly, the secondary particles 150 may have high flowability and dispersibility in the polymer resin matrix, and thus, the secondary particles 150 may be provided in the polymer resin matrix with a high fraction. In other words, as the secondary particle 150 has a higher sphericity, the secondary particle 150 may have higher flowability and dispersibility in the polymer resin matrix, and thus the fraction of the secondary particle 150 in the polymer resin matrix may be improved.

For example, the polymer resin may include at least one of an epoxy resin, a urethane resin, a polyimide resin, nylon, polyisoprene, polydicyclopentadiene, polytetrafluoroethylene, polyphenylene sulfide, polyphenylene oxide, silicon, polyketone, aramid, cellulose, polyimide, rayon, polymethyl methacrylate, polyvinylidene chloride, polyvinylidene fluoride, polyurethane, polyisobutylene, polychloroprene, polybutadiene, polypropylene, polyvinyl chloride, polyvinyl acetate, polystyrene, polyester, polyvinyl pyrrolidone, polycyanoacrylate, polyacrylonitrile, polyamide, polyarylene ethynylene, polyphenylene ethynylene, polythiophene, polyaniline, polypyrrole, polybutylene terephthalate, polyethylene terephthalate, aromatic polyamide, polyamide, polycarbonate, polystyrene, polyphenylene sulfide, polysulfone, polyethersulfone, polyetherimide, polyetheretherketone, polyarylate, polymethylmethylacrylate, polyvinyl alcohol, polypropylene, polyethylene, poly(acrylonitrile-butadiene-styrene), or a poly(styrene-butadiene-styrene) copolymer.

In addition, the secondary particle 150 may have a particle size distribution of 1 to 10 um, and may have one maximum peak within a range of 1 to 5 um.

In addition, in XRD analysis of the secondary particles 150, a fraction of a secondary phase and a phase of a heterogeneous material may be 1% or less. For example, when the primary particle 110 is hexagonal boron nitride, the secondary phase may be at least one of cubic boron nitride, rhombohedral boron nitride, or wurtzite boron nitride, and the heterogeneous material may include at least one of boric anhydride, magnesium carbonate, zinc oxide, silicon oxide, or aluminum oxide.

In other words, in the XRD analysis of the secondary particle 150, the secondary particle 150 may include substantially more than 99% of hexagonal boron nitride, and may include less than or equal to 1% of cubic boron nitride, rhombohedral boron nitride, or wurtzite boron nitride. Accordingly, the thermal conductivity characteristics of the material may be improved.

Depending on the type of the polymer resin, a material used for the surface treatment of the secondary particles 150 may be controlled. When the polymer resin is an epoxy resin, the secondary particles 150 may be surface-treated using at least one of epoxy silane, amino silane, mercapto silane, or isocyanate silane, when the polymer resin is an urethane resin, the secondary particles 150 may be surface-treated using at least one of epoxy silane, amino silane, ureido silane, mercapto silane, or isocyanate silane, and when the polymer resin is a polyimide resin, the secondary particles 150 may include at least one of epoxy silane, amino silane, ureido silane, or isocyanate silane.

In addition, as described above, when the secondary particles 150 are used together with the polymer resin, an additional filler (second filler) may be further used in addition to the secondary particles 150 (first filler). For example, the second filler may include at least one of carbon, carbon black, CNT, graphite, aluminum flake, magnesium oxide, aluminum nitride, copper, boric anhydride, magnesium carbonate, zinc oxide, silicon oxide, aluminum oxide, or stainless steel.

The secondary particles 150 may be provided in the form of a solid pellet without being mixed with the polymer resin. In this case, the pellet may be produced by providing the secondary particles 150 in a mold and compressing the same.

FIGS. 5 and 6 are views for explaining a process of producing a thermal interface layer using the heat dissipation material produced according to the method for producing a heat dissipation material according to Example 1 of the present application.

Referring to FIGS. 5 and 6, a thermal interface layer may be formed between a heat generation part 210 and a heat absorption part 220 by using the secondary particles 150, which has been described with reference to FIGS. 1 to 4, as the heat dissipation material/filler.

The plurality of secondary particles 150 may be disposed in a polymer resin matrix 160 including a polymer resin, and the thermal interface layer may be formed by applying a pressure to the heat generation part 210 and the heat absorption part 220.

If as shown in FIG. 5, the compressive strength of the secondary particles 150 is excessively high so that the secondary particles 150 may not be collapsed during formation of the thermal interface layer, an interface may be damaged, such as cracks generated at an interface of the heat generation part 210 making contact with the secondary particles 150 and at an interface of the heat absorption part 220 making contact with the secondary particles 150.

Furthermore, since the heat transfer path may be formed only by the secondary particles 150 which are not collapsed and maintain shapes thereof, there is a limitation in forming the heat transfer path between the heat generation part 210 and the heat absorption part 220, and there is a limitation in improving a filling rate of the secondary particles 150 with respect to a volume of the thermal interface layer.

However, the secondary particles 150 according to the embodiment of the present application may have a compressive strength that enables easy collapse during formation of the thermal interface layer while maintaining a shape of an aggregate. Accordingly, in the step of producing the thermal interface layer by using the heat dissipation material produced using the secondary particles 150, as shown in FIG. 6, the secondary particles 150 in the heat dissipation material may be easily compressed with a load exceeding the compressive strength of the secondary particles 150, so that at least a portion of the secondary particles 150 may be collapsed.

Accordingly, a plurality of pieces 1523 may be generated from the collapsed secondary particles 150, and the plurality of pieces 152 and uncollapsed secondary particles 150 may coexist while being mixed with each other in the thermal interface layer.

The plurality of pieces may be aggregated primary particles 110 or the primary particles 110.

The damage to the interface of the heat generation part 210 and the interface of the heat absorption part 220, which make contact with the secondary particles 150, may be prevented by the secondary particles 150 that are collapsed in the process of applying the load, and an additional heat transfer path may be formed between the heat generation part 210 and the heat absorption part 220 by the plurality of pieces 152 generated due to the collapse of the secondary particles 150, so that the thermal conductivity of the thermal interface layer may be improved.

In addition, the plurality of pieces 152 and the uncollapsed secondary particles 150 coexist in the thermal interface layer, so that the same effect as that fillers having substantially different sizes are present in the thermal interface layer may be realized, and as a result, a filling rate of the thermal interface layer may be improved.

FIG. 7 is a view for explaining a process of producing a thermal interface layer using the heat dissipation material produced according to the method for producing a heat dissipation material according to a modified example of Example 1 of the present application.

Referring to FIG. 7, as described with reference to FIGS. 5 and 6, a thermal interface layer may be formed between a heat generation part 210 and a heat absorption part 220 by using the secondary particles 150, which has been described with reference to FIGS. 1 to 4, as the heat dissipation material/filler.

Specifically, a guide template 170 may be provided between the heat generation part 210 and the heat absorption part 220. An inner space of the guide template 170 may be empty. That is, the guide template 170 may have a partition wall provided at edges of the heat generation part 210 and the heat absorption part 220, and the inner space may be open.

The heat dissipation material, which includes the polymer resin matrix 160 and the secondary particles 150 dispersed in the polymer resin matrix 160 may be applied to the empty inner space of the guide template 170 and then a pressure may be applied to the heat generation part 210 and the heat absorption part 220, thereby forming the thermal interface layer.

The guide template 170 may prevent a large amount of the secondary particles 150 of the heat dissipation material from leaking to the outside in the process of forming the thermal interface layer, may have a high compressive strength, and may have a thickness that substantially coincides with a thickness of the thermal interface layer. That is, the heat dissipation material may be compressed by the thickness of the guide template 170 due to the pressure applied to the heat generation part 210 and the heat absorption part 220.

In this case, the thickness of the guide template 170 may be smaller than the diameter and thickness of the secondary particle 150, and the guide template 170 may have a higher compressive strength than the secondary particle 150. Accordingly, the secondary particle 150 may be easily collapsed due to the pressure applied in the process of forming the thermal interface layer, and accordingly, an additional heat transfer path may be formed between the heat absorption part 220 and the heat generation part 210 by the plurality of pieces 152 generated by the collapse of the secondary particles 150, so that the thermal conductivity of the thermal interface layer may be improved, and the filling rate of the thermal interface layer may be improved.

Figure 8:
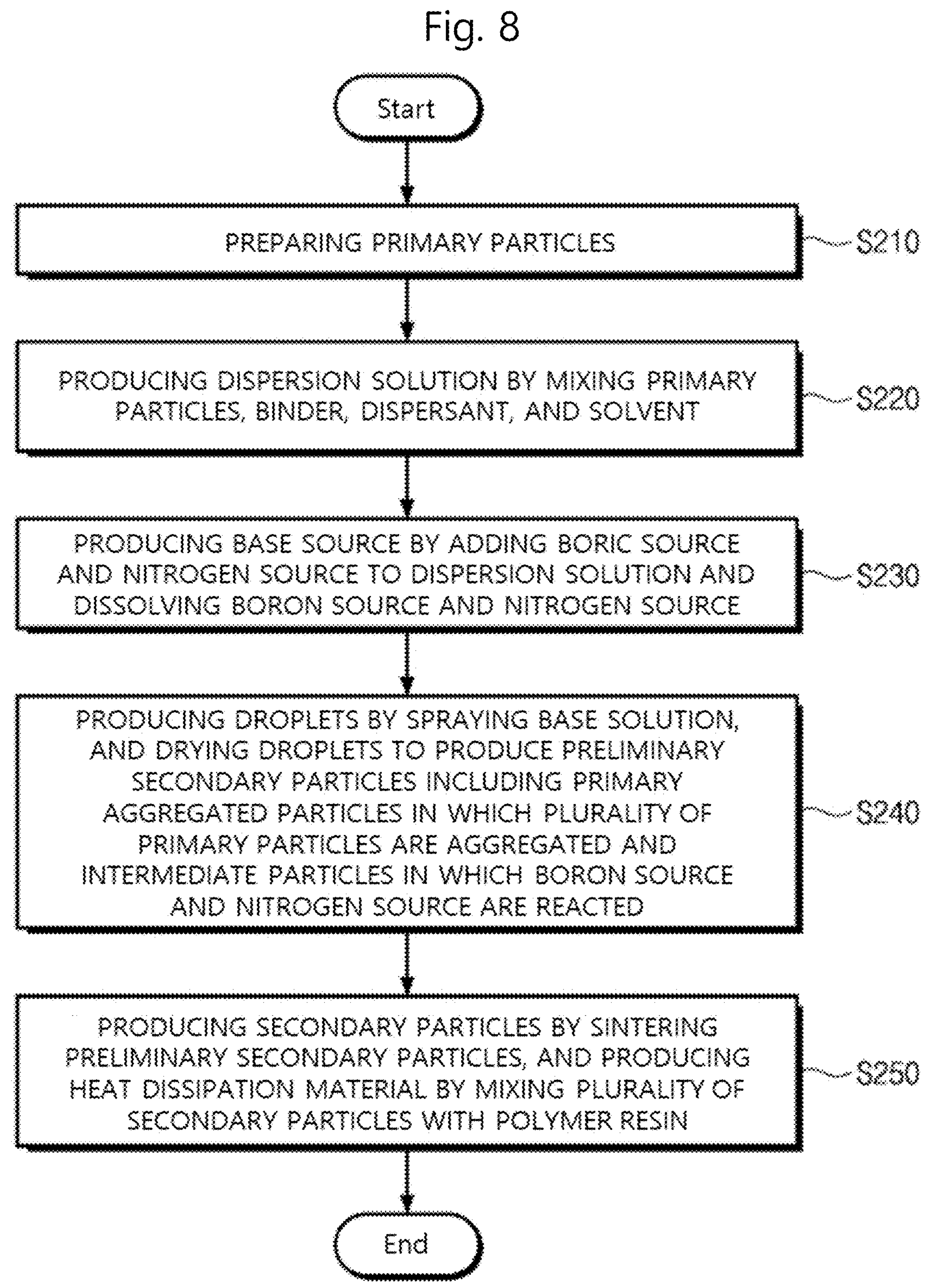
FIG. 8 is a flowchart for explaining a method for producing a heat dissipation material according to Example 2 of the present application.

FIG. 8 is a flowchart for explaining a method for producing a heat dissipation material according to Example 2 of the present application, and FIGS. 9 and 10 are views for explaining a method for producing a heat dissipation material according to Example 2 of the present application.

Referring to FIGS. 8 to 10, primary particles 110 are prepared (S210).

According to one embodiment, the primary particle 110 may be boron nitride (BN) having a hexagonal crystal structure. Alternatively, according to still another embodiment, the primary particles 110 may be at least one of carbon (C), silicon carbide (SiC), diamond, beryllium oxide (BeO), boron phosphide (BP), aluminum nitride (AlN), beryllium sulfide (BeS), boron arsenide (BAs), silicon (Si), gallium nitride (GaN), aluminum phosphide (AlP), or gallium phosphide (GaP).

In addition, according to one embodiment, the primary particle 110 may have a flake and/or plate shape as shown in FIG. 2.

Alternatively, according to another embodiment, the primary particle 110 may have a shape of at least one of a nanoparticle, a nanotube, a nanoflake, a nanoneedle, a nanofiber, a nanodot, a nanosheet, a nanoribbon, a nanoplate, a nanosphere, a nanohorn, a nanocone, or a nanoscroll.

As described above, when the primary particle 110 is boron nitride having a hexagonal crystalline structure, the primary particle 110 may be provided in a state of being exfoliated from bulk-type boron nitride.

As described below, a plurality of primary particles 110 may be aggregated to form secondary particles 150. In this case, as a size of the primary particle 110 decreases, sphericity of the secondary particles 150 may be improved, and thus flowability and dispersibility of the secondary particles 150 in the polymer resin may be improved. In contrast, when the size of the primary particle 110 is excessively small, an interface between the primary particles 110 may act as resistance of heat transfer, thereby deteriorating thermal conduction characteristics.

According to one embodiment of the present application, the secondary particle 150 may have a size of 1 to 10 um or a size of 1 to 5 um, and the primary particle 110 may have a size of 1 to 10% compared to the size of the secondary particle 150 in at least two axes among three axes, or in directions of all the three axes. Specifically, for example, the primary particle 110 may have a thickness of about 10 nm or less and a size of about 70 nm in a plane direction, or may have a thickness of about 30 nm or less and a size of about 200 nm in the plane direction.

According to one embodiment, a surface treatment may be performed on the primary particles 110. As described above, for example, when the primary particle 110 is boron nitride, a plurality of nitrogen groups (N-terminations) may be provided on a surface of the primary particle 100 as shown in FIG. 2. In this case, the nitrogen group on the surface of the primary particle 110 may be substituted with A first functional group 112 by a surface treatment process. For example, the first functional group 112 may be a hydroxyl group (OH), and a process of substituting the nitrogen group with the first functional group 112 may be performed by a method for immersing the primary particles 110 in a basic solution (for example, NaOH), and then drying the same.

Alternatively, according to another embodiment, the nitrogen group may be substituted with the first functional group 122 (hydroxyl group) by a method for heat-treating (for example, 1,000° C.) the primary particles 110 in the air, immersing the primary particles 110 in an acidic solution (for example, a sulfuric acid, a nitric acid, a phosphoric acid, etc.), immersing the primary particles 110 in a basic solution (for example, NaOH, KOH, etc), and then oxidizing the primary particles 110 with an oxidizing agent (for example, $KMnO_4$, $H_2O_2$, etc).

Alternatively, unlike the above description, according to another embodiment, the first functional group 112 substituting the nitrogen group on the surface of the primary particle 110 may be a hydrogen group (—H). In this case, a thiol molecule such as epoxy thiol may be used instead of epoxy silane described below.

Specifically, as shown in FIG. 3, at least some of ends of the nitrogen group of the boron nitride may be substituted with the first functional group 112 (hydroxyl group).

If unlike the above description, a large amount of nitrogen groups are present on the surface of the primary particle 110 because the surface treatment is not performed on the primary particles 110, the primary particles 110 may be aggregated with each other in the source solution produced using the primary particles 110, so that the degree of dispersion may be deteriorated, thereby deteriorating sphericity of the secondary particles 150 that are formed by aggregation of the primary particles 110. Furthermore, sintering may not proceed smoothly in a subsequent sintering process.

Meanwhile, as described above, according to the embodiment of the present application, the nitrogen group on the surface of the primary particle 110 may be substituted with the first functional group 112 (for example, a hydroxyl group) through the surface treatment process. Accordingly, the primary particles 110 may have high dispersibility in the source solution, and therefore, sphericity of the secondary particles 150 formed by aggregation of the primary particles 110 may be increased, and the sintering process may be promoted by the first functional group 112 in a subsequent sintering process.

After the surface treatment process for the primary particles 110 is completed, a dispersion solution may be produced by mixing the primary particles 110, a binder, a dispersant, and a solvent (S220). In the dispersion solution, a proportion of the primary particles 110 may be 1 to 10 wt %, a proportion of the dispersant may be 0.1 to 1 wt %, and a proportion of the binder may be 0.1 to 5 wt %.

The proportions of the primary particles 110, the solvent, and the dispersant in the source solution may be controlled such that a zeta-potential of the dispersion solution may have a maximum value.

For example, the binder may be polyvinyl alcohol. Alternatively, as another example, the binder may include at least one of polyethylene glycol (PEG), methyl cellulose (MC), polyacrylic acid (PAA), polyacrylonitrile, or polyacrylamide.

For example, the dispersant may be an ammonium polymethacrylate aqueous solution. Alternatively, as another example, the dispersant may include at least one of a polycarboxylic acid-based dispersant (acrylic acid-based dispersant, a methacrylic acid-based dispersant, and a copolymer dispersant), a phosphate dispersant, a phosphate complex-based dispersant, an aryl sulfonic acid dispersant, and an amine-based dispersant. Specifically, the dispersant may include an inorganic dispersant including at least one of calcium phosphate salt, magnesium salt, hydrophilic silica, hydrophobic silica, or colloidal silica, may include a nonionic polymer dispersant including at least one of polyoxyethylene alkylether, polyoxyalkylene alkylphenol ether, sorbitan fatty acid ester, polyoxyalkylene fatty acid ester, glycerin fatty acid ester, polyvinyl alcohol, alkyl cellulose, or polyvinyl pyrrolidone, or may include an ionic polymer dispersant including at least one of polyacrylamide, polyvinylamine, polyvinylamine N-oxide, polyvinylammonium salt, polydialkyldiallylammonium salt, polyacrylic acid, polystyrene sulfonic acid, polyacrylic salt, polysulfonic acid, or polyaminoalkylacrylic acid.

For example, the solvent may be pure water or ultrapure water. Alternatively, as another example, the solvent may include at least one of chloroform, chlorobenzene, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ether, diethyl ether, dimethoxymethane, N,N-dimethylformamide, ethanol, ethylamine, ethylbenzene, ethylene glycol ether, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene), m-xylene, o-xylene, p-xylene, 1,2-dichlorobenzene, 1,3-dichlorobenzene, 1,4-dichlorobenzene, or methyl pyrrolidone.

Alternatively, as another example, the solvent is a non-aqueous dispersant (solvent-based dispersant), and may include at least one of an alcohol ester-based (glycerin) solvent, a polyether-based solvent, an amine-based solvent, a sulfonic acid-based solvent, or a cation-based solvent. Specifically, the solvent may include at least one of fatty acid salt, alkylsulfonate salt, alpha-olefin sulfonate salt, alkanesulfonate salt, alkylbenzenesulfonate salt, sulfosuccinate ester salt, alkylsulfate ester salt, alkylether sulfate ester salt, alkylether carboxylate salt, alpha sulfo fatty acid methyl ester salt, methyltaurate salt, glycerin fatty acid ester, polyglycerin fatty acid ester, sucrose fatty acid ester, sorbitan fatty acid ester, polyoxyethylene sorbitan fatty acid ester, polyoxyethylene alkyl ether, polyoxyethylene alkyl phenyl ether, polyoxyethylene fatty acid ester, fatty acid alkanolamide, or alkyl glucoside.

Subsequently, a base source may be produced by adding a boron source and a nitrogen source to the dispersion solution and dissolving the boron source and the nitrogen source (S230). For example, the boron source may include boric acid, and the nitrogen source may include melamine.

Droplets may be produced by spraying the base source, and the droplets may be dried to produce preliminary secondary particles 140 (S240). According to one embodiment, the preliminary secondary particle 140 may include primary aggregated particles 120 in which a plurality of primary particles are aggregated, and intermediate particles 130 in which the boron source and the nitrogen source are reacted. For example, the intermediate particle 130 may be melanin diborate.

The droplets obtained by spraying the base source may be rapidly dried and produced as the preliminary secondary particles, and a shape of the intermediate particle 130 may be controlled according to a weight ratio of the boron source to the nitrogen source in the base source.

According to one embodiment, the shape of the intermediate particle 130 may be controlled according to the weight ratio of the boron source to the nitrogen source. Specifically, when the weight ratio of the boron source to the nitrogen source is 1:1, the intermediate particle 130 may have a pillar shape, when the weight ratio of the boron source to the nitrogen source is 1:1 to 7:1, the intermediate particle 130 may have a sphere shape having an uneven structure on a surface thereof, and when the weight ratio of the boron source to the nitrogen source is 7:1 to 14:1, the intermediate particle 130 may have a sphere shape.

The base solution may be sprayed in the form of droplets using an ultrasonic vibrator. Alternatively, the base source may be sprayed in the form of droplets using a spray.

The plurality of the primary particles 110 may be present in the droplet, and a size of the preliminary secondary particle 140 may be controlled according to a size of the droplet. The droplet may be adjusted to 10 um or less or 3 um or less, and in this case, an average size of the preliminary secondary particles 140 may be about 2 um.

The preliminary secondary particles 140 may be obtained using a centrifuge and then washed.

Secondary particles 150 may be produced by sintering the preliminary secondary particles 140, and a heat dissipation material may be produced by mixing the plurality of secondary particles 150 with a polymer resin (S250). That is, the heat dissipation material may include the secondary particles 150 dispersed in a matrix including the polymer resin, in which the preliminary secondary particles 140 are sintered.

The step of sintering the preliminary secondary particles 140 may be performed by a method for heat-treating the preliminary secondary particles 140 under an inert gas atmosphere. For example, the inert gas may be nitrogen gas, and may be sintered at a temperature of 1100° C. or higher and lower than 1500° C. for 2 hours or longer.

In the process of heat-treating the preliminary secondary particles 140, the intermediate particle 130 may be formed to have a phase identical to a phase of the primary aggregated particle 120. Specifically, the intermediate particles 130 may be reacted at a temperature of 900° C. or higher to form an h-BN phase like the primary aggregated particles 120.

In addition, the secondary particles 150 may be produced at a relatively low temperature by the intermediate particles 130. Specifically, when the secondary particles are produced without the intermediate particles 130 by sintering the preliminary secondary particle consisting of the primary aggregated particles 120, the binding and sintering between the primary aggregated particles 120 are not easily performed at a relatively low temperature of about 1100° C., so that as the secondary particles are loosened by a fine impact, a high heat treatment temperature of 1500° C. may be required. However, in contrast, when the secondary particles 150 are produced by sintering the preliminary secondary particles 140 composed of the primary aggregated particles 120 and the intermediate particles 130, since the binding and sintering between the primary aggregated particles 120 may be easily performed by the intermediate particles 130, the secondary particles 150 may be easily produced even at a relatively low temperature of about 1100° C.

As described above, the first functional group 112 (for example, a hydroxyl group) may be provided on the surface of the primary particle 110, and thus, the first functional group 112 may act as a sintering aid in a process of sintering the preliminary secondary particles 140. Therefore, the preliminary secondary particles 140 may be easily sintered, and as a result, interfacial bonding properties between the primary particles 110 in the preliminary secondary particles 140 may be improved, thermal conductivity of the secondary particles 150 produced by sintering the preliminary secondary particles 140 may be improved, and a compressive strength of the secondary particles 150 may be improved.

According to one embodiment, the compressive strength of the secondary particles 150 may be controlled according to a temperature at which the preliminary secondary particles 140 are heat-treated. Specifically, as the temperature at which the preliminary secondary particles 140 are heat-treated increases, the compressive strength of the secondary particle 150 may increase. For example, the compressive strength of the secondary particles 150 may be 5 MPa or less, more specifically, for example, 0.2 to 2 MPa.

Accordingly, as will be described later, in the step of producing a thermal interface layer by using the heat dissipation material, at least a portion of the secondary particles 150 may easily be collapsed, and therefore, a plurality of heat transfer paths are formed in the thermal interface layer, thereby improving the thermal conductivity and minimizing damage to a heat transfer layer and a heat absorption layer, which make contact with the thermal interface layer.

Before the secondary particles 150 are mixed with the polymer resin, a step of surface-treating the secondary particle 150 to bind a second functional group to a surface of the secondary particle 150, and a step of immersing the secondary particles 150 in a polymer solution to bind a polymer group to the surface of the secondary particle 150 may be further performed. For example, the second functional group may be a hydroxyl group, and the polymer group may be an epoxy group. In this case, for example, the second functional group may be bounded to the surface of the secondary particle 150 by immersing the secondary particles 150 in a basic solution (for example, NaOH), and the polymer group may be bounded to the surface of the secondary particle 150 by immersing the secondary particles 150 in an epoxy silane solution.

Thereafter, the plurality of secondary particles 150 may be mixed with the polymer resin, thereby producing the heat dissipation material.

The secondary particle 150 produced according to the embodiment of the present application is a filler used together with the polymer resin, and the secondary particle 150 may have a high sphericity (for example, 70% or greater). Accordingly, the secondary particles 150 may have high flowability and dispersibility in the polymer resin matrix, and thus, the secondary particles 150 may be provided in the polymer resin matrix with a high fraction. In other words, as the secondary particle 150 has a higher sphericity, the secondary particle 150 may have higher flowability and dispersibility in the polymer resin matrix, and thus the fraction of the secondary particle 150 in the polymer resin matrix may be improved.

For example, the polymer resin may include at least one of an epoxy resin, a urethane resin, a polyimide resin, nylon, polyisoprene, polydicyclopentadiene, polytetrafluoroethylene, polyphenylene sulfide, polyphenylene oxide, silicon, polyketone, aramid, cellulose, polyimide, rayon, polymethyl methacrylate, polyvinylidene chloride, polyvinylidene fluoride, polyurethane, polyisobutylene, polychloroprene, polybutadiene, polypropylene, polyvinyl chloride, polyvinyl acetate, polystyrene, polyester, polyvinyl pyrrolidone, polycyanoacrylate, polyacrylonitrile, polyamide, polyarylene ethynylene, polyphenylene ethynylene, polythiophene, polyaniline, polypyrrole, polybutylene terephthalate, polyethylene terephthalate, aromatic polyamide, polyamide, polycarbonate, polystyrene, polyphenylene sulfide, polysulfone, polyethersulfone, polyetherimide, polyetheretherketone, polyarylate, polymethylmethylacrylate, polyvinyl alcohol, polypropylene, polyethylene, poly(acrylonitrile-butadiene-styrene), or a poly(styrene-butadiene-styrene) copolymer.

In addition, the secondary particle 150 may have a particle size distribution of 1 to 10 um, and may have one maximum peak within a range of 1 to 5 um.

For example, when the primary particle 110 is hexagonal boron nitride, the secondary phase may be at least one of cubic boron nitride, rhombohedral boron nitride, or wurtzite boron nitride, and the heterogeneous material may include at least one of boric anhydride, magnesium carbonate, zinc oxide, silicon oxide, or aluminum oxide.

In other words, in the XRD analysis of the secondary particle 150, the secondary particle 150 may include substantially more than 99% of hexagonal boron nitride, and may include less than or equal to 1% of cubic boron nitride, rhombohedral boron nitride, or wurtzite boron nitride. Accordingly, the thermal conductivity characteristics of the material may be improved.

Depending on the type of the polymer resin, a material used for the surface treatment of the secondary particles 150 may be controlled. When the polymer resin is an epoxy resin, the secondary particles 150 may be surface-treated using at least one of epoxy silane, amino silane, mercapto silane, or isocyanate silane, when the polymer resin is an urethane resin, the secondary particles 150 may be surface-treated using at least one of epoxy silane, amino silane, ureido silane, mercapto silane, or isocyanate silane, and when the polymer resin is a polyimide resin, the secondary particles 150 may include at least one of epoxy silane, amino silane, ureido silane, or isocyanate silane.

In addition, as described above, when the secondary particles 150 are used together with the polymer resin, an additional filler (second filler) may be further used in addition to the secondary particles 150 (first filler). For example, the second filler may include at least one of carbon, carbon black, CNT, graphite, aluminum flake, magnesium oxide, aluminum nitride, copper, boric anhydride, magnesium carbonate, zinc oxide, silicon oxide, aluminum oxide, or stainless steel.

The secondary particles 150 may be provided in the form of a solid pellet without being mixed with the polymer resin. In this case, the pellet may be produced by providing the secondary particles 150 in a mold and compressing the same.

Hereinafter, a characteristic evaluation result according to a specific experimental examples of the present application will be described.

Production of Heat Dissipation Material According to Experimental Example 1

As the primary particles, first h-BN nanoflakes having a thickness of about 10 nm or less and a size of about 70 nm in a plane direction, and second h-BN nanoflakes having a thickness of about 30 nm or less and a size of about 200 nm in the plane direction were prepared.

For a surface treatment of the first h-BN nanoflakes and the second h-BN nanoflakes, the first h-BN nanoflakes and the second h-BN nanoflakes were immersed in a 5 M NaOH solution (60° C.) for 18 hours, and nitrogen groups (N-terminations) on the surfaces of the first h-BN nanoflakes and the second h-BN nanoflakes were substituted with hydroxyl groups (OH-terminations), thereby improving a degree of dispersion for water and improving sphericity of secondary particles. In addition, surface modification may promote sintering of the first h-BN nanoflakes and the second h-BN nanoflakes in a subsequent sintering process.

The surface-treated first h-BN nanoflakes and the surface-treated second h-BN nanoflakes were separately dispersed in a solvent together with a dispersant and a binder to produce source solutions, respectively. Water was used as a solvent, an ammonium polymethacrylate aqueous solution (Darvan-C) was used as a dispersant, and PVA was used as a binder, and the first h-BN nanoflakes and the second h-BN nanoflakes were controlled to be 5 wt %, the dispersant was controlled to be 0.5 wt %, and the binder was controlled to be 1.25 wt %.

The source solution was spray-dried to produce spherical preliminary secondary particles. Specifically, the source solution was sprayed while controlling the size of the droplets to be 10 um or less, and dried to produce the spherical preliminary secondary particles.

Thereafter, the preliminary secondary particles were washed 3 times using a centrifuge, and sintered under a nitrogen atmosphere at 1500° C. for 2 hours to produce secondary particles.

After the sintering process, the secondary particles were immersed in 5M NaOH (60° C.) for 18 hours and surface-treated to have a hydroxyl group, and then were immersed in an epoxy silane solution (80° C.) and surface-treated to have an epoxy group (epoxy termination).

Figure 11:
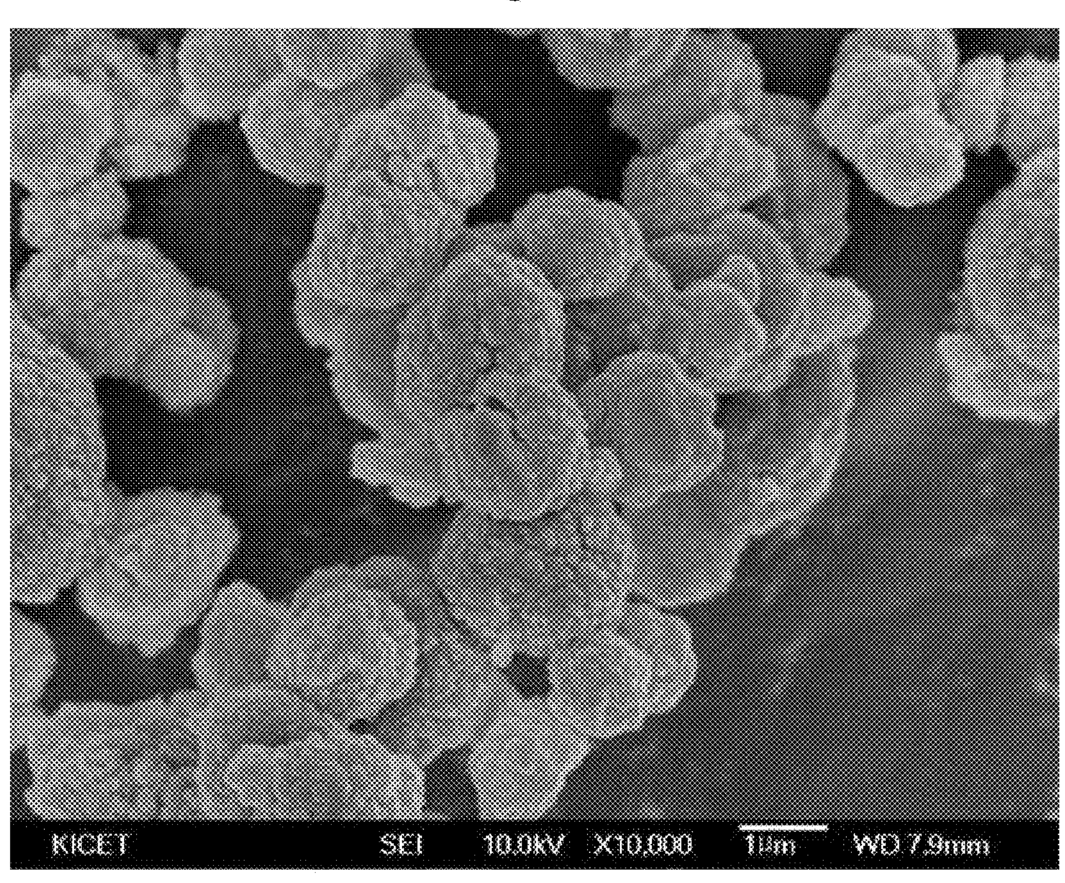
FIGS. 11 to 13 are SEM photographs of secondary particles produced according to Experimental Example 1 of the present application.
Figure 12:
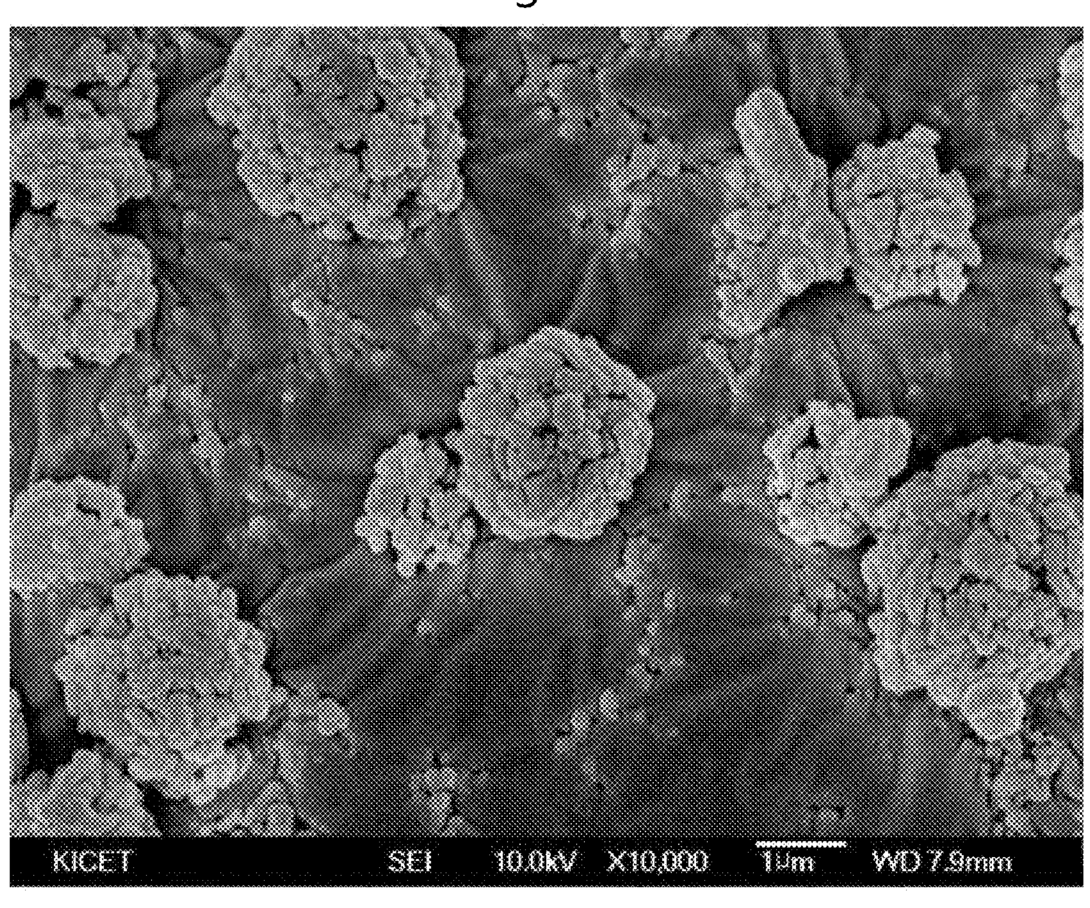
Figure 13:
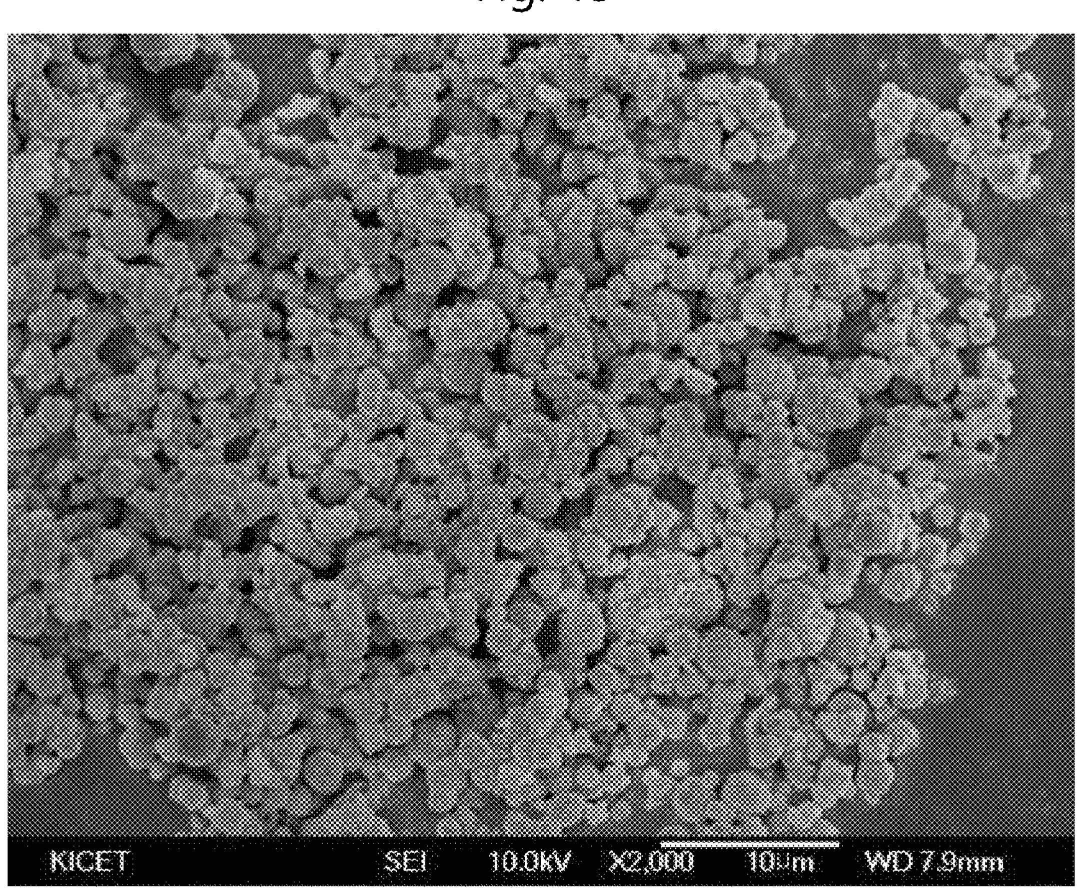

FIGS. 11 to 13 are SEM photographs of secondary particles produced according to Experimental Example 1 of the present application.

Referring to FIGS. 11 to 13, SEM photographs of secondary particles produced according to Experimental Example 1 were captured. FIG. 11 is an SEM photograph (high magnification) of secondary particles which are produced using primary particles having a size of 70 nm so as to have an average size of about 2 um, FIG. 12 is an SEM photograph of secondary particles which are produced using primary particles of 200 nm so as to have an average size of about 2 um, and FIG. 13 is an SEM photograph (low magnification) of secondary particles which are produced using primary particles having a size of 70 nm so as to have an average size of about 2 um.

As can be seen from FIGS. 11 to 13, when the primary particles having a relatively small size are used, it is confirmed that the secondary particles have higher sphericity and fewer pores in the secondary particles than when the primary particles having a relatively large size are used.

FIG. 14 is a photograph of a contact angle which is measured according to a surface treatment of the secondary particles produced according to Experimental Example 1 of the present application.

Referring to FIG. 14, a contact angle of the secondary particle, which is produced to have an average size of about 2 um, was measured using the primary particle having a size of 70 nm. FIG. 14(*a*) is a photograph of a contact angle of the secondary particle which is measured immediately after the sintering, FIG. 14(*b*) is a photograph of a contact angle of the secondary particle which is measured by being treated using NaOH, and FIG. 14(*c*) is a photograph of a contact angle of the secondary particle which is measured by being treated using epoxy silane.

As can be seen from FIG. 14, the contact angle of the secondary particle immediately after the sintering is measured to be high at 22.8°, but when the hydroxyl group is bounded using NaOH, it is confirmed that high hydrophilicity is obtained. Thereafter, when the epoxy group is bounded using the epoxy silane, it is confirmed that the contact angle is slightly increased again and measured to be 14.6°.

Production of Secondary Particles According to Experimental Example 2-1

The first h-BN nanoflakes described in Experimental Example 1 were prepared to produce secondary particles in the same manner as in Experimental Example 1, but secondary particles according to Experimental Example 2-1 were produced by controlling a proportion of the primary particles in the source solution to 5 wt %, and controlling a gas flow rate to 550 to 600 L/h, a pump rate to 15% (when 100%, 30 ml/min), and an inlet temperature to 150° C.

Production of Secondary Particles According to Experimental Example 2-2

Secondary particles were produced in the same manner as in Experimental Example 2-1, but the proportion of the primary particles in the source solution was controlled to 3 wt %.

Production of Secondary Particles According to Experimental Example 2-3

Secondary particles were produced in the same manner as in Experimental Example 2-1, but the proportion of the primary particles in the source solution was controlled to 2 wt %.

Production of Secondary Particles According to Experimental Example 2-4

Secondary particles were produced in the same manner as in Experimental Example 2-1, but the proportion of the primary particles in the source solution was controlled to 1.5 wt %.

Production of Secondary Particles According to Experimental Example 2-5

Secondary particles were produced in the same manner as in Experimental Example 2-1, but the proportion of the primary particles in the source solution was controlled to 1.3 wt %.

Production of Secondary Particles According to Experimental Example 2-6

Secondary particles were produced in the same manner as in Experimental Example 2-1, but the proportion of the primary particles in the source solution was controlled to 1 wt %.

Conditions for producing the secondary particles according to Experimental Examples 2-1 to 2-6 are shown in <Table 1> below.

TABLE 1

| Classification | Ratio of Primary Particles (wt %) |
|---|---|
| Experimental Example 2-1 | 5 |
| Experimental Example 2-2 | 3 |
| Experimental Example 2-3 | 2 |
| Experimental Example 2-4 | 1.5 |
| Experimental Example 2-5 | 1.3 |
| Experimental Example 2-6 | 1 |

Figures 15, 16:
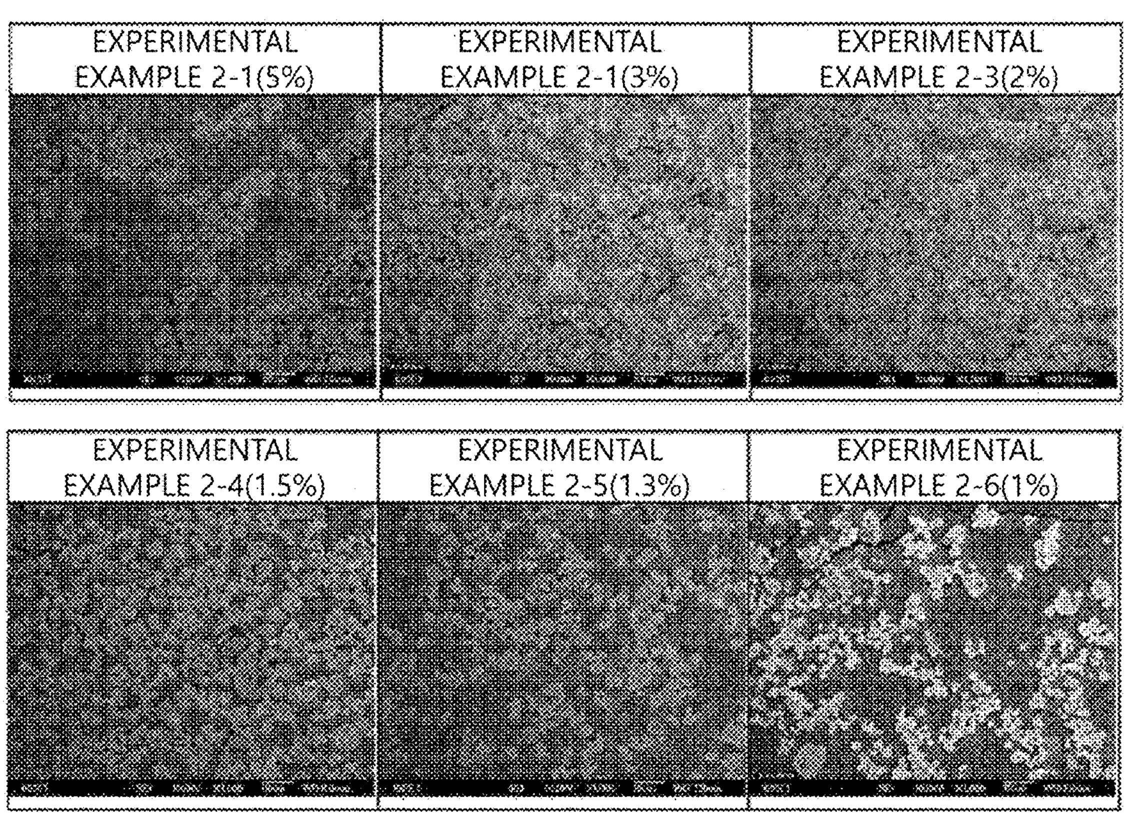
FIG. 15 shows SEM photographs of secondary particles produced according to Experimental Examples 2-1 to 2-6 of the present application.
FIG. 16 shows SEM photographs of secondary particles produced according to Experimental Examples 3-1 to 3-4 of the present application.

FIG. 15 shows SEM photographs of secondary particles produced according to Experimental Examples 2-1 to 2-6 of the present application.

Referring to FIG. 15, when the content of the primary particles is 5 wt % and 1 wt %, it is confirmed that the size of the secondary particle is different by an average of 1 um or greater. In addition, it is confirmed the h-BN nanoflake particles present in the source solution are not perfectly and evenly dispersed, and thus a concentration difference between the discharged droplets occurs as the concentration is high, so that uniformity of the particle size of the secondary particle is deteriorated.

In addition, it was confirmed that D50 was 8 um under the condition that the content of the primary particles is 5 wt %, and D50 is 3 um under the condition that the content of the primary particles is 1 wt %.

Production of Secondary Particles According to Experimental Example 3-1

Secondary particles produced in the same manner as in Experimental Example 2-1 were prepared.

Production of Secondary Particles According to Experimental Example 3-2

Secondary particles were produced in the same manner as in Experimental Example 3-1, but the gas flow rate when spraying the source solution with the spray was controlled to 500 to 550 L/h.

Production of Secondary Particles According to Experimental Example 3-3

Secondary particles were produced in the same manner as in Experimental Example 3-1, but the gas flow rate when spraying the source solution with the spray was controlled to 450 to 500 L/h.

Production of Secondary Particles According to Experimental Example 3-4

Secondary particles were produced in the same manner as in Experimental Example 3-1, but the gas flow rate when spraying the source solution with the spray was controlled to 400 to 450 L/h.

Conditions for producing the secondary particles according to Experimental Examples 3-1 to 3-4 are shown in <Table 2> below.

TABLE 2

| Classification | Gas Flow Rate (L/h) |
|---|---|
| Experimental Example 3-1 | 500 to 600 |
| Experimental Example 3-2 | 500 to 550 |
| Experimental Example 3-3 | 450 to 500 |
| Experimental Example 3-4 | 400 to 450 |

FIG. 16 shows SEM photographs of secondary particles produced according to Experimental Examples 3-1 to 3-4 of the present application.

Referring to FIG. 16, as the gas flow rate increases, the discharged force may increase, and the energy of the ejected droplet may increase. In addition, as the speed of the sprayed droplets increases, the size of the droplet decreases, and accordingly, the size of granules to be aggregated decreases.

As can be seen from FIG. 16, under conditions of the gas flow rate of 550 to 600 L/h compared to the gas flow rate of 400 to 450 L/h, it is confirmed that the average size of the secondary particle is different up to 1 um. That is, it is confirmed that the size of the secondary particle may be controlled through gas flow rate control.

Production of Secondary Particles According to Experimental Example 4-1

Secondary particles produced in the same manner as in Experimental Example 2-1 were prepared.

Production of Secondary Particles According to Experimental Example 4-2

Secondary particles were produced in the same manner as in Experimental Example 3-1, but an inlet temperature was controlled to 170° C.

Production of Secondary Particles According to Experimental Example 4-3

Secondary particles were produced in the same manner as in Experimental Example 3-1, but an inlet temperature was controlled to 190° C.

Conditions for producing secondary particles according to Experimental Example 4-1 to Experimental Example 4-3 are shown in <Table 3> below.

TABLE 3

| Classification | Inlet Temperature (° C.) |
|---|---|
| Experimental Example 4-1 | 150 |
| Experimental Example 4-2 | 170 |
| Experimental Example 4-3 | 190 |

Figure 17:
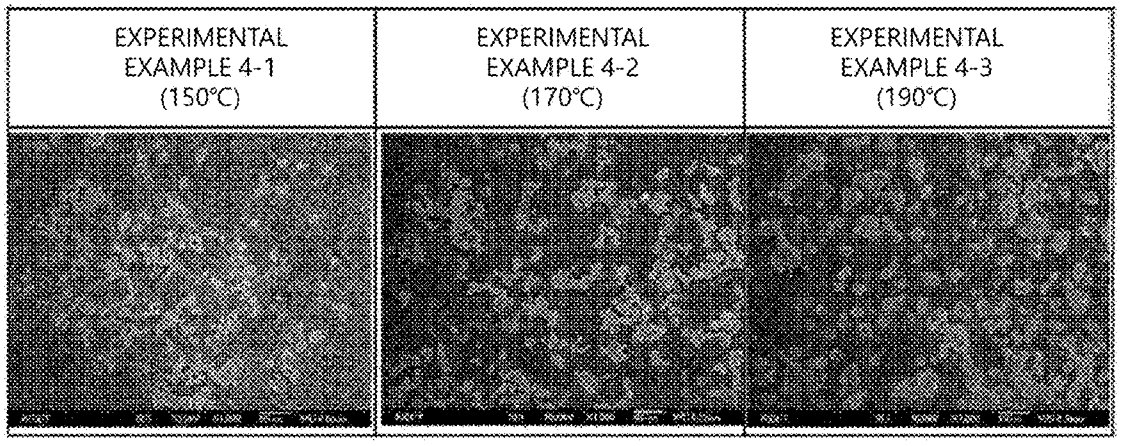
FIG. 17 shows SEM photographs of secondary particles produced according to Experimental Examples 4-1 to 4-3 of the present application.

FIG. 17 shows SEM photographs of secondary particles produced according to Experimental Examples 4-1 to 4-3 of the present application.

Referring to FIG. 17, it is confirmed that as the temperature increases, the size of the granules increases, whereas the sphericity decreases. This is because surface tension of the scattered droplets decreases as the temperature increases, so that the spherical shape may not be maintained, and the solvent inside the granules rapidly evaporates due to rapid drying, thereby collapsing the structure of the droplets.

Figure 18:
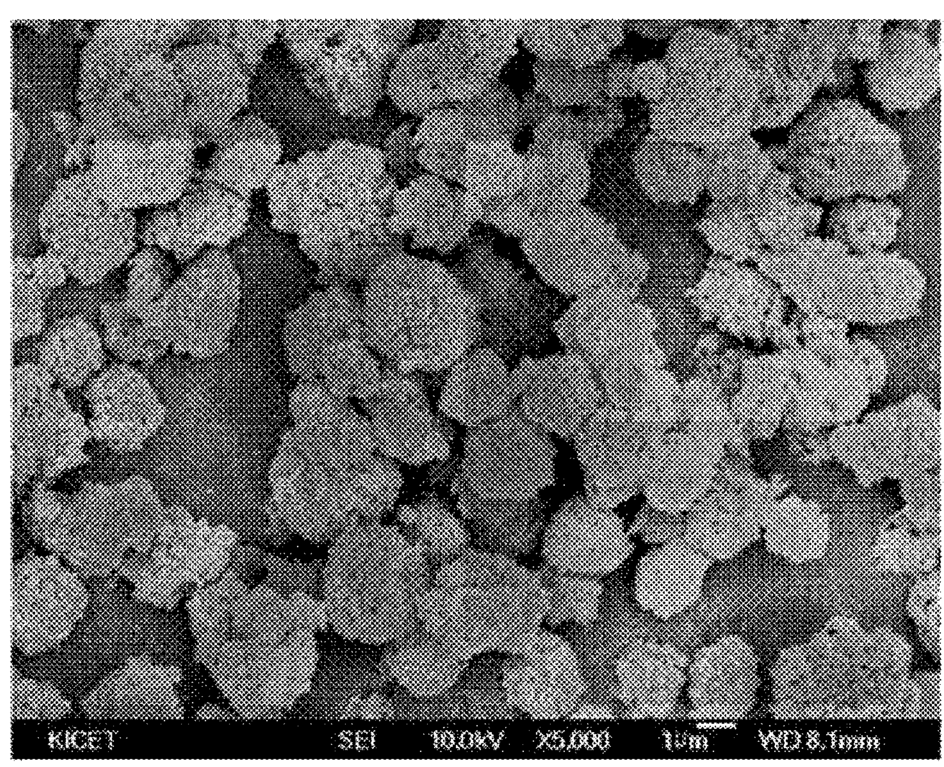
FIGS. 18 and 19 are an SEM image and an XRD analysis graph of the secondary particles produced according to Experimental Example 1 of the present application, respectively.
Figure 19:
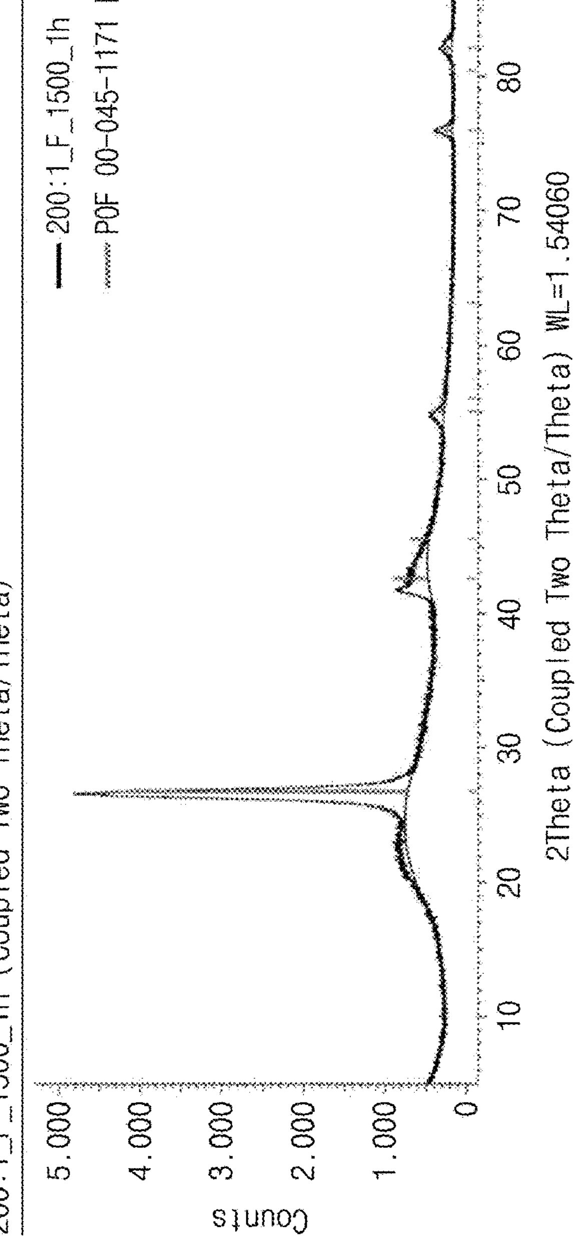

FIGS. 18 and 19 are an SEM image and an XRD analysis graph of the secondary particles produced according to Experimental Example 1 of the present application, respectively.

Referring to FIGS. 18 and 19, an SEM photograph of secondary particles produced using the first h-BN nanoflakes according to the above-described Experimental Example 1 was captured, and XRD analysis was performed.

As shown in FIGS. 18 and 19, it is confirmed that a fraction of a secondary phase and a phase of a heterogeneous material is 1% or less. That is, it can be seen that secondary particle powders are composed of more than 99% hexagonal boron nitride, and include less than or equal to 1% of cubic boron nitride, rhombohedral boron nitride, or wurtzite boron nitride.

Figure 20:
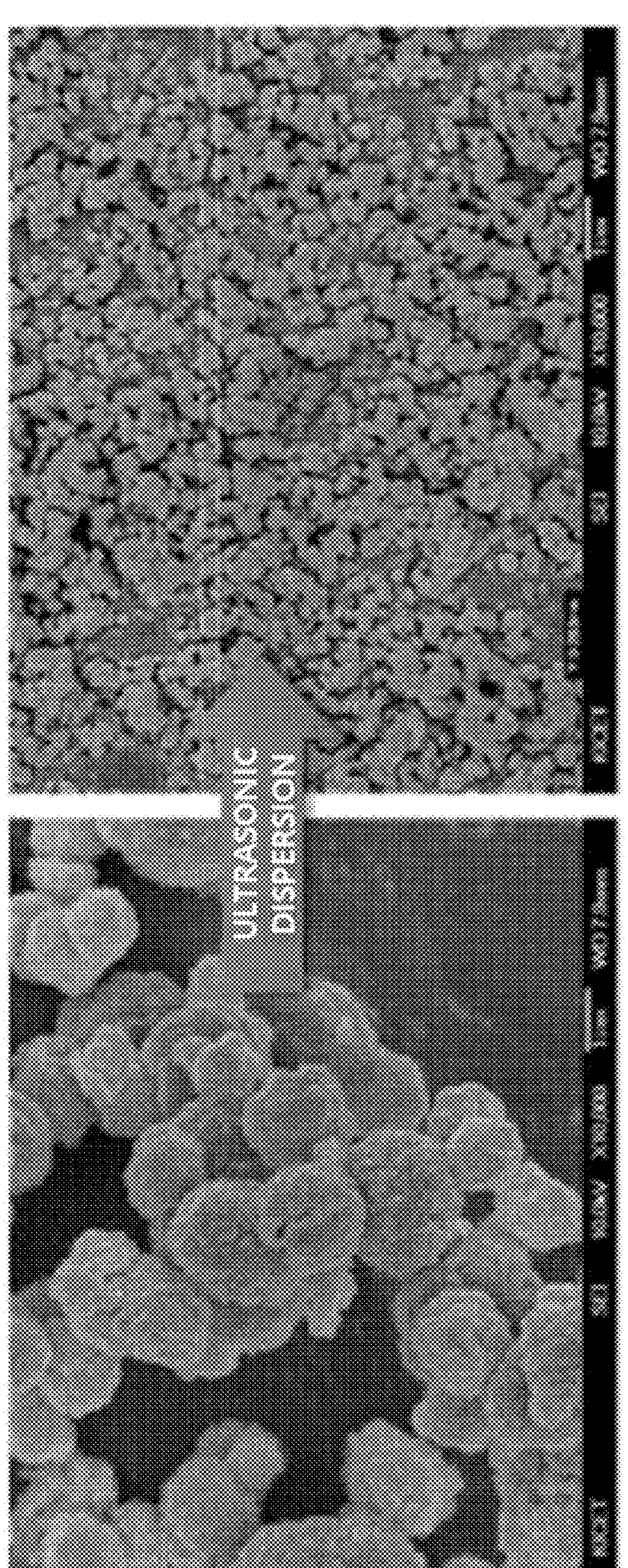
FIG. 20 is an SEM photograph after ultrasonic dispersion of preliminary secondary particles produced according to Experimental Example 1 of the present application.
Figure 21:
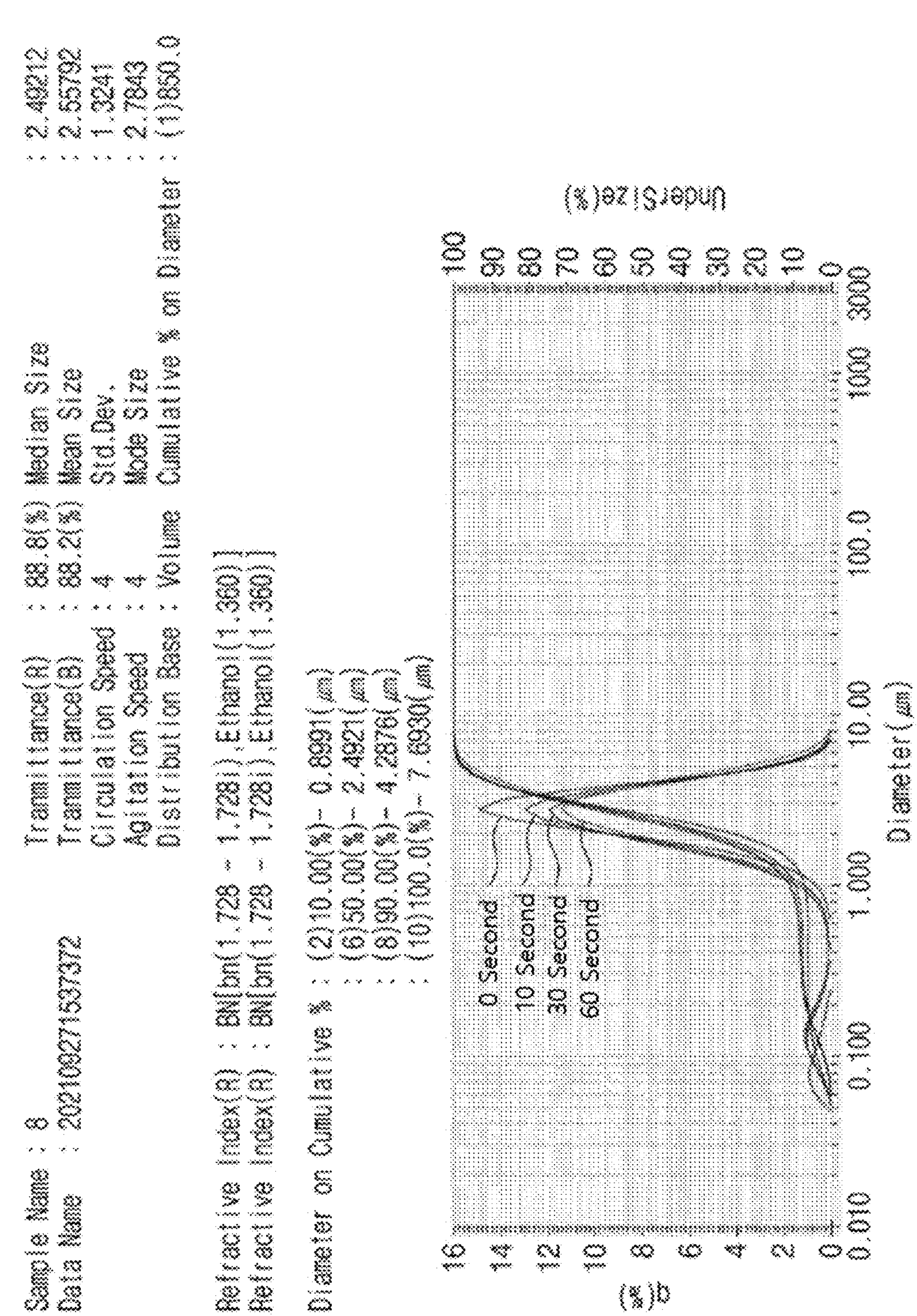
FIG. 21 is a graph analyzing a particle size ratio after ultrasonic dispersion of the secondary particles produced according to Experimental Example 1 of the present application.

FIG. 20 is an SEM photograph after ultrasonic dispersion of preliminary secondary particles produced according to Experimental Example 1 of the present application, and FIG. 21 is a graph analyzing a particle size ratio after ultrasonic dispersion of the secondary particles produced according to Experimental Example 1 of the present application.

Referring to FIGS. 20 and 21, preliminary secondary particles were produced using the first h-BN nanoflakes according to Experimental Example 1, the preliminary secondary particles before sintering and the preliminary secondary particles after sintering were dispersed in water, and an ultrasonic treatment was performed under conditions of 200 KHz and 200 W.

As shown in FIG. 20, it is confirmed that granular and aggregation forms of the preliminary secondary particles before sintering are loosened, so that the plurality of preliminary secondary particles are restored to the primary particles again.

Meanwhile, when the secondary particles, which are subjected to the sintering process, is subjected to the ultrasonic treatment at 0 seconds, 10 seconds, 30 seconds, and seconds, it is confirmed that a peak value of the maximum particle size slightly decreases, but a reduction amount thereof significantly decreases over time, and it is confirmed that the peak value of the maximum particle size is maintained at about 74% even after 60 seconds has elapsed.

That is, the primary particles may be aggregated with high cohesion by the sintering aid provided in the process of producing the secondary particles to form the secondary particles, and accordingly, it is confirmed that the secondary particles are not collapsed even by the ultrasonic impact, and maintain the peak value of the maximum particle size of 40 to 90%. Accordingly, the secondary particles may maintain a spherical shape without being collapsed during the producing process and/or distribution process, and thus the secondary particles may have high dispersibility and flowability in the polymer matrix.

In the source solution in which the primary particles (the first h-BN nanoflakes having a size of about 70 nm), the solvent (water), and the dispersant (ammonium polymethacrylate aqueous solution) were mixed, which has been described with reference to Experimental Example 1, the zeta-potential according to the proportions of the primary particles and the dispersant was measured as shown in <Table 4> to <Table 6> below.

As can be seen from <Table 4> to <Table 6> below, it is confirmed that the zeta-potential has a maximum value under a condition that the proportion of the dispersant is greater than 0.45 wt % and less than 0.55 wt %, and the maximum value of the zeta-potential increases as the proportion of the primary particles decreases.

TABLE 4

| | Proportion of Dispersant (wt %) | Zeta-potential (mV) |
|---|---|---|
| Proportion of Primary Particles 10 wt % | 0.40 | 51.52 |
| | 0.45 | 58.13 |
| | 0.50 | 67.18 |
| | 0.55 | 63.24 |
| | 0.60 | 61.32 |
| | 0.65 | 57.43 |
| | 0.70 | 55.45 |
| | 0.75 | 50.29 |
| | 0.80 | 48.20 |

TABLE 5

| | Proportion of Dispersant (wt %) | Zeta-potential (mV) |
|---|---|---|
| Proportion of Primary Particles 7.69 wt % | 0.40 | 54.53 |
| | 0.45 | 60.23 |
| | 0.50 | 69.12 |
| | 0.55 | 63.24 |
| | 0.60 | 62.22 |
| | 0.65 | 60.31 |
| | 0.70 | 59.87 |
| | 0.75 | 55.74 |
| | 0.80 | 50.96 |

TABLE 6

| | Proportion of Dispersant (wt %) | Zeta-potential (mV) |
|---|---|---|
| Proportion of Primary Particles 6.25 wt % | 0.40 | 58.62 |
| | 0.45 | 63.65 |
| | 0.50 | 70.12 |
| | 0.55 | 69.18 |
| | 0.60 | 68.75 |
| | 0.65 | 63.29 |
| | 0.70 | 60.58 |
| | 0.75 | 57.31 |
| | 0.80 | 53.29 |

In the above-described example of zeta-potential measurement, the proportion of the dispersant was fixed to 0.5 wt %, and the zeta-potential according to the proportion of the binder was measured as shown in <Table 7> to <Table 9> below.

As can be seen from <Table 7> to <Table 9> below, when the binder is added, it is confirmed that the maximum value of the zeta-potential slightly decreases, and the zeta-potential has the maximum value under a condition that the proportion of the binder is greater than 1.20 wt % and less than 1.30 wt %.

TABLE 7

| | Proportion of Binder (wt %) | Zeta-potential (mV) |
|---|---|---|
| Proportion of Primary Particles 10 wt % Proportion of Dispersant 0.5 wt % | 1.00 | 55.13 |
| | 1.05 | 56.32 |
| | 1.10 | 58.21 |
| | 1.15 | 60.2 |
| | 1.20 | 61.15 |
| | 1.25 | 63.57 |
| | 1.30 | 61.39 |
| | 1.35 | 59.48 |
| | 1.40 | 57.82 |

TABLE 8

| | Proportion of Binder (wt %) | Zeta-potential (mV) |
|---|---|---|
| Proportion of Primary Particles 7.69 wt % Proportion of Dispersant 0.5 wt % | 1.00 | 54.12 |
| | 1.05 | 54.23 |
| | 1.10 | 56.99 |
| | 1.15 | 61.25 |
| | 1.20 | 61.27 |
| | 1.25 | 65.52 |
| | 1.30 | 61.39 |
| | 1.35 | 58.62 |
| | 1.40 | 55.23 |

TABLE 9

| | Proportion of Binder (wt %) | Zeta-potential (mV) |
|---|---|---|
| Proportion of Primary Particles 6.25 wt % Proportion of Dispersant 0.5 wt % | 1.00 | 56.89 |
| | 1.05 | 57.65 |
| | 1.10 | 58.01 |
| | 1.15 | 59.94 |
| | 1.20 | 61.35 |
| | 1.25 | 65.66 |
| | 1.30 | 64.96 |
| | 1.35 | 62.15 |
| | 1.40 | 57.82 |

Production of Secondary Particles According to Experimental Example 5

Boric acid ($H_3BO_3$), melamine ($C_3H_6N_6$), and a dispersant were reacted by injecting the same into distilled water and stirring. The dispersant was used in an amount of 1 wt % or greater, Darvan-c was used as the dispersant, and the stirring was performed at a temperature of 80° C. for 24 hours or longer to sufficiently disperse boric acid and melamine ions in the solution.

A binder was injected into the stirred reaction solution and further stirred. PVA was used as a binder. Additional stirring was performed at a temperature of 90° C. for 30 minutes or longer.

The solution dispersed in water was spray-dried by an ultrasonic method to produce preliminary secondary particles, and the preliminary secondary particles were sintered at a temperature of 1500° C. or higher to produce secondary particles.

FIG. 22 shows SEM photographs of secondary particles produced according to Experimental Example 5 of the present application.

Referring to FIG. 22, an SEM photograph of secondary particles produced according to Experimental Example 5 described above was captured. As can be seen in FIG. 22, it is confirmed that the spherical particles have a size of about 1 to 2 um based on D50.

FIG. 23 shows SEM photographs of crystalline shapes of general melamine diborate.

Referring to FIG. 23, an SEM photograph of melamine diborate, which is a compound precipitated by reaction of a precursor combination dissolved in a solution in the process of producing secondary particles according to Experimental Example 5, was captured.

As can be seen from FIG. 23, it is confirmed that melamine diborate has a columnar crystal structure, and is dried in the form of primary columnar particles having a cylindrical structure when generally precipitated.

Figure 24:
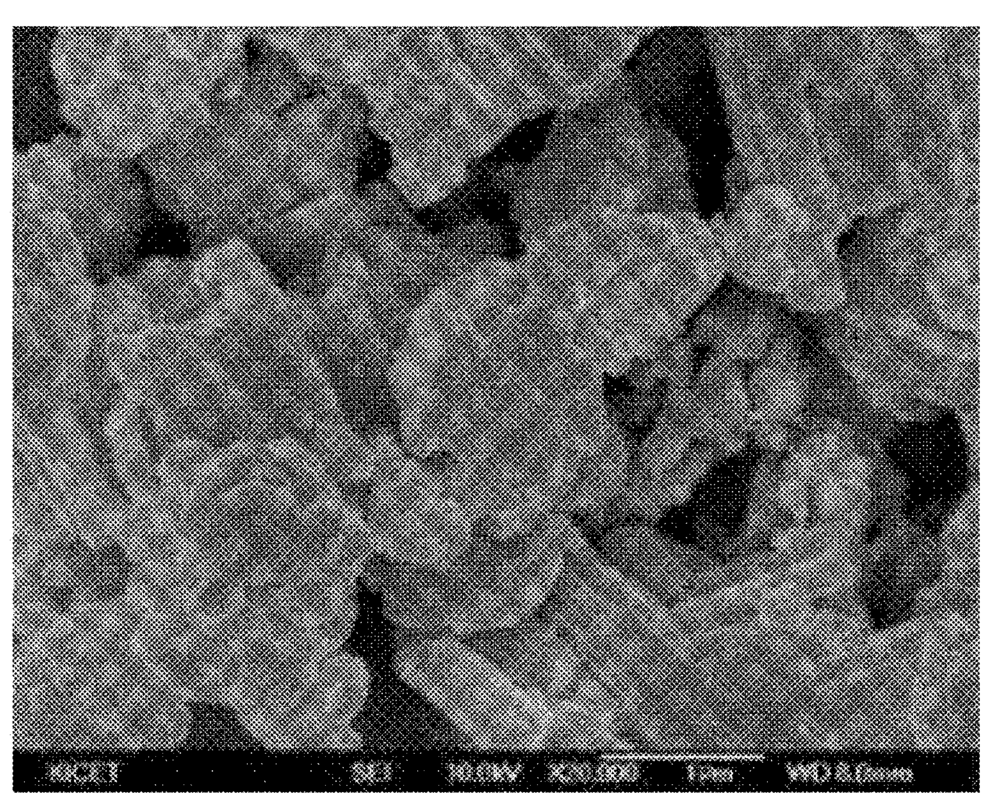

FIGS. 24 and 25 are SEM photographs of secondary particles according to Experimental Example 5, which are produced by varying a mixing ratio of boric acid and melamine.

Referring to FIGS. 24 and 25, SEM photographs of particles, which are produced after producing the secondary particles according to Experimental Example 5 by varying the mixing ratio of boric acid and melamine, were captured. Specifically, FIG. 24 shows a photograph in which boric acid and melamine are mixed at a weight ratio of 1:1, a photograph shown at an upper portion of FIG. 25 is a photograph in which boric acid and melamine are mixed at a weight ratio of 7:1 to 14:1, and a photograph shown at a lower portion of FIG. 25 is a photograph in which boric acid and melamine are mixed at a weight ratio of 1:1 to 7:1.

As can be seen from FIG. 24, when boric acid and melamine are mixed at a weight ratio of 1:1, it is confirmed that the secondary particles have a short columnar shape. In contrast, as can be seen in FIG. 25, when boric acid and melamine are mixed at a weight ratio of 1:1 to 7:1, it could be seen that the secondary particles have a shape of a collapsed grape skin, and when boric acid and melamine are mixed at a weight ratio of 7:1 to 14:1, it is confirmed that the secondary particles have a spherical shape.

FIG. 26 shows SEM photographs of boric acid formed in a process of producing secondary particles according to Experimental Example 5 of the present application, and FIG. 27 shows SEM photographs of melamine formed in the process of producing secondary particles according to Experimental Example 5 of the present application.

Referring to FIG. 26, an SEM photograph of boric acid that is spray-dried in the process of producing the secondary particles according to Experimental Example 5 was captured, and referring to FIG. 27, an SEM photograph of melamine that is spray-dried in the process of producing the secondary particles according to Experimental Example 5 was captured. As shown in FIG. 26, the spray-dried boric acid had a hollow sphere shape, and as shown in FIG. 27, it is confirmed that the spray-dried melamine has a solid sphere shape.

Production of Secondary Particles According to Experimental Example 6

As the primary particles, first h-BN nanoflakes having a thickness of about 10 nm or less and a size of about 70 nm in a plane direction, and second h-BN nanoflakes having a thickness of about 30 nm or less and a size of about 200 nm in the plane direction were prepared.

For a surface treatment of the first h-BN nanoflakes and the second h-BN nanoflakes, the first h-BN nanoflakes and the second h-BN nanoflakes were immersed in a 5 M NaOH solution (60° C.) for 18 hours, and nitrogen groups (N-terminations) on the surfaces of the first h-BN nanoflakes and the second h-BN nanoflakes were substituted with hydroxyl groups (OH-terminations), thereby improving a degree of dispersion for water and improving sphericity of secondary particles. In addition, surface modification may promote sintering of the first h-BN nanoflakes and the second h-BN nanoflakes in a subsequent sintering process.

The surface-treated first h-BN nanoflakes and second h-BN nanoflakes were separately dispersed in a solvent together with a dispersant and a binder to produce dispersion solutions, respectively. Water was used as a solvent, an ammonium polymethacrylate aqueous solution (Darvan-C) was used as a dispersant, and PVA was used as a binder, and the first h-BN nanoflakes and the second h-BN nanoflakes were controlled to be 40 wt %, the dispersant was controlled to be 0.5 wt %, and the binder was controlled to be 1.25 wt %.

Boric acid ($H_3BO_3$) and melamine ($C_3H_6N_6$) were added to the dispersion solution and dissolved to produce a base source. Boric acid and melamine were added at a weight ratio of 7:1 or greater and 14:1 or less.

The base source was spray-dried to produce spherical preliminary secondary particles. Specifically, the base source was sprayed while controlling the size of the droplets to be 10 um or less, and dried to produce the spherical preliminary secondary particles. The preliminary secondary particle was composed of primary aggregated particles in which a plurality of primary particles are aggregated, and intermediate particles produced by the reaction of boric acid and melamine.

Thereafter, the preliminary secondary particles were washed 3 times using a centrifuge, and sintered under a nitrogen atmosphere at 1100° C. for 2 hours to produce secondary particles.

Figure 28:
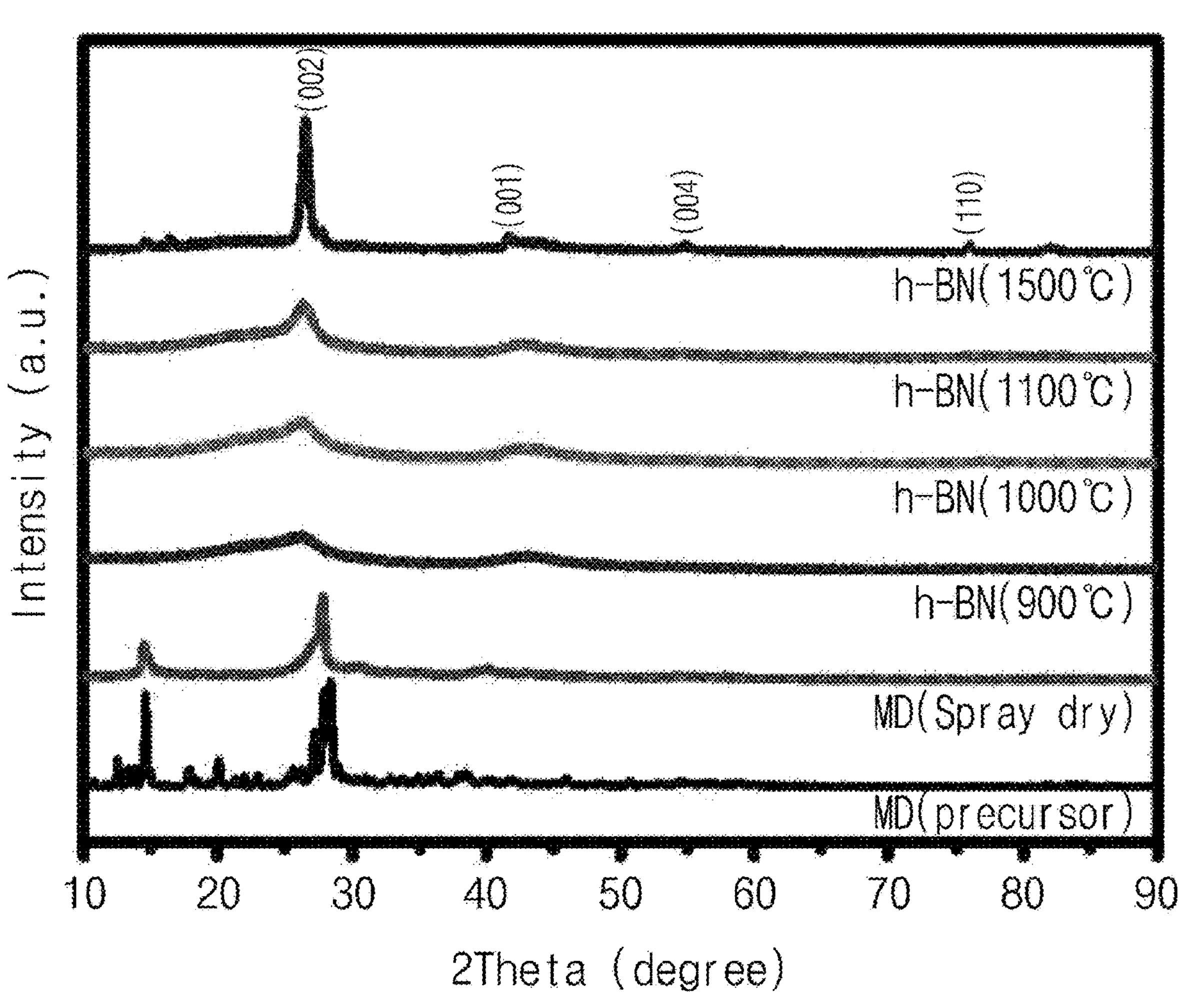
FIG. 28 is a view for explaining XRD characteristics according to a heat treatment temperature of intermediate particles formed in a process of producing secondary particles according to Experimental Example 6 of the present application.

FIG. 28 is a view for explaining XRD characteristics according to a heat treatment temperature of intermediate particles formed in a process of producing secondary particles according to Experimental Example 6 of the present application.

Referring to FIG. 28, X-ray diffraction (XRD) characteristics of the intermediate particles, which are formed by the reaction of boric acid and melamine during the process of producing the secondary particles according to Experimental Example 6, according to a heat treatment temperature are shown.

As shown in FIG. 28, it is confirmed that the intermediate particles are reacted at a temperature of 900° C. or higher to form an h-BN phase.

Figure 29:
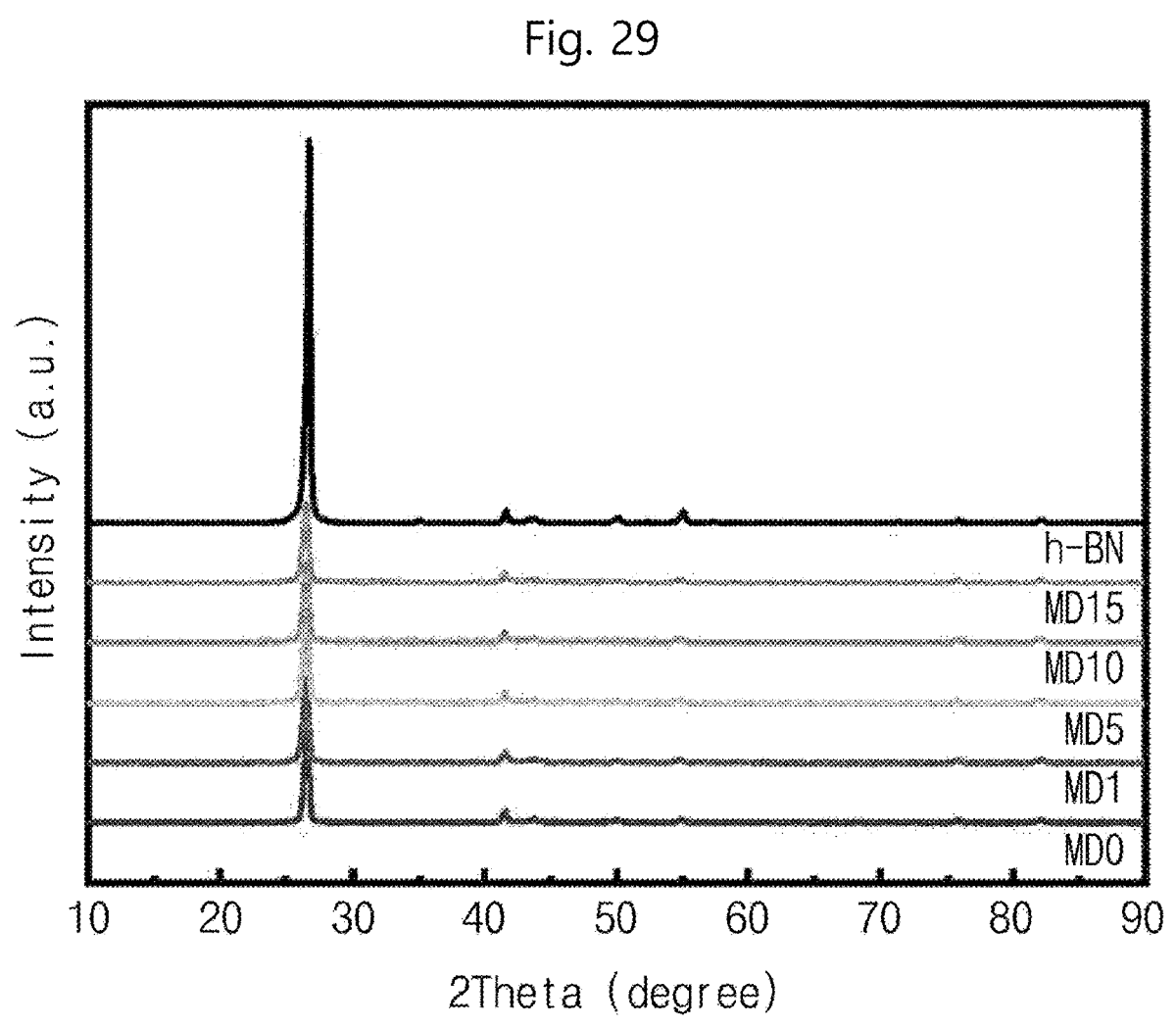

FIG. 29 is a view for explaining XRD characteristics of the secondary particles according to Experimental Example 6 of the present application.

Referring to FIG. 29, after a plurality of samples are produced by controlling such that a content of the intermediate particles is different from that of the primary particles during the process of producing the secondary particles according to Experimental Example 6, XRD characteristics for each sample are shown. Specifically, MD0 represents secondary particles produced by controlling the content of intermediate particles to 0 wt % relative to the primary particles, MD1 represents secondary particles produced by controlling the content of intermediate particles to 1 wt % relative to the primary particles, MD5 represents secondary particles produced by controlling the content of intermediate particles to 5 wt % relative to the primary particles, MD10 represents secondary particles produced by controlling the content of intermediate particles to 10 wt % relative to the primary particles, and MD15 represents secondary particles produced by controlling the content of intermediate particles to 15 wt % relative to the primary particles.

As can be seen in FIG. 29, it is confirmed that all of the plurality of samples have a single phase of h-BN.

Figure 30:
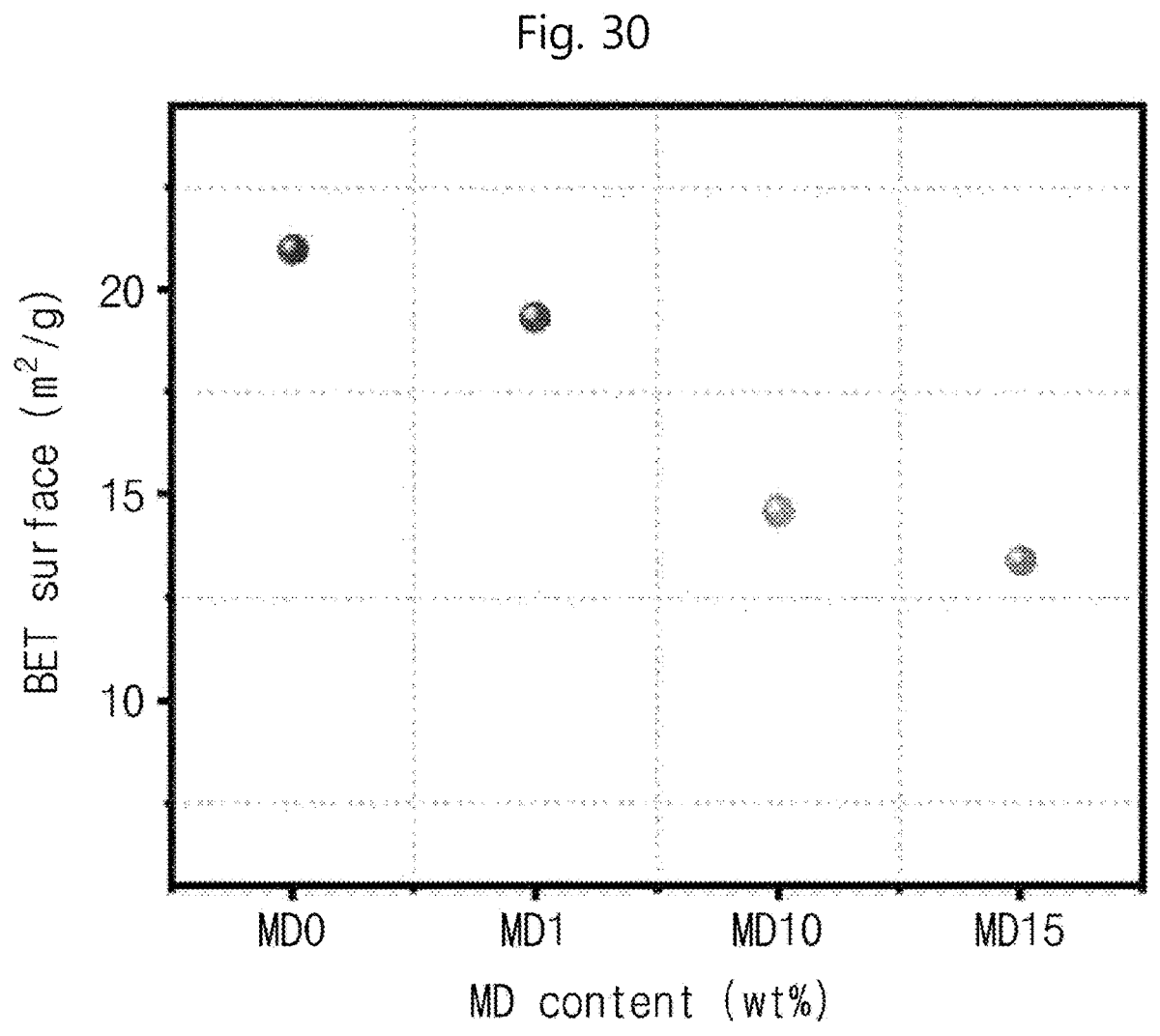

FIG. 30 is a view for explaining a BET specific surface area of the secondary particles according to Experimental Example 6 of the present application.

Referring to FIG. 30, after a plurality of samples are produced by controlling such that a content of the intermediate particles is different from that of the primary particles during the process of producing the secondary particles according to Experimental Example 6, a BET specific surface area for each sample is measured and shown. The MD0 to MD15 are as described with reference to FIG. 29. The measured BET specific surface area is summarized in Table 10 below.

TABLE 10

| Classification | BET surface (m2/g) |
|---|---|
| MD0 | 20.983 |
| MD1 | 19.332 |
| MD10 | 14.614 |
| MD15 | 13.418 |

As can be seen from FIG. 30 and <Table 10>, it is confirmed that as the content of the intermediate particles increases, the BET specific surface area of the secondary particles decreases.

Figure 31:
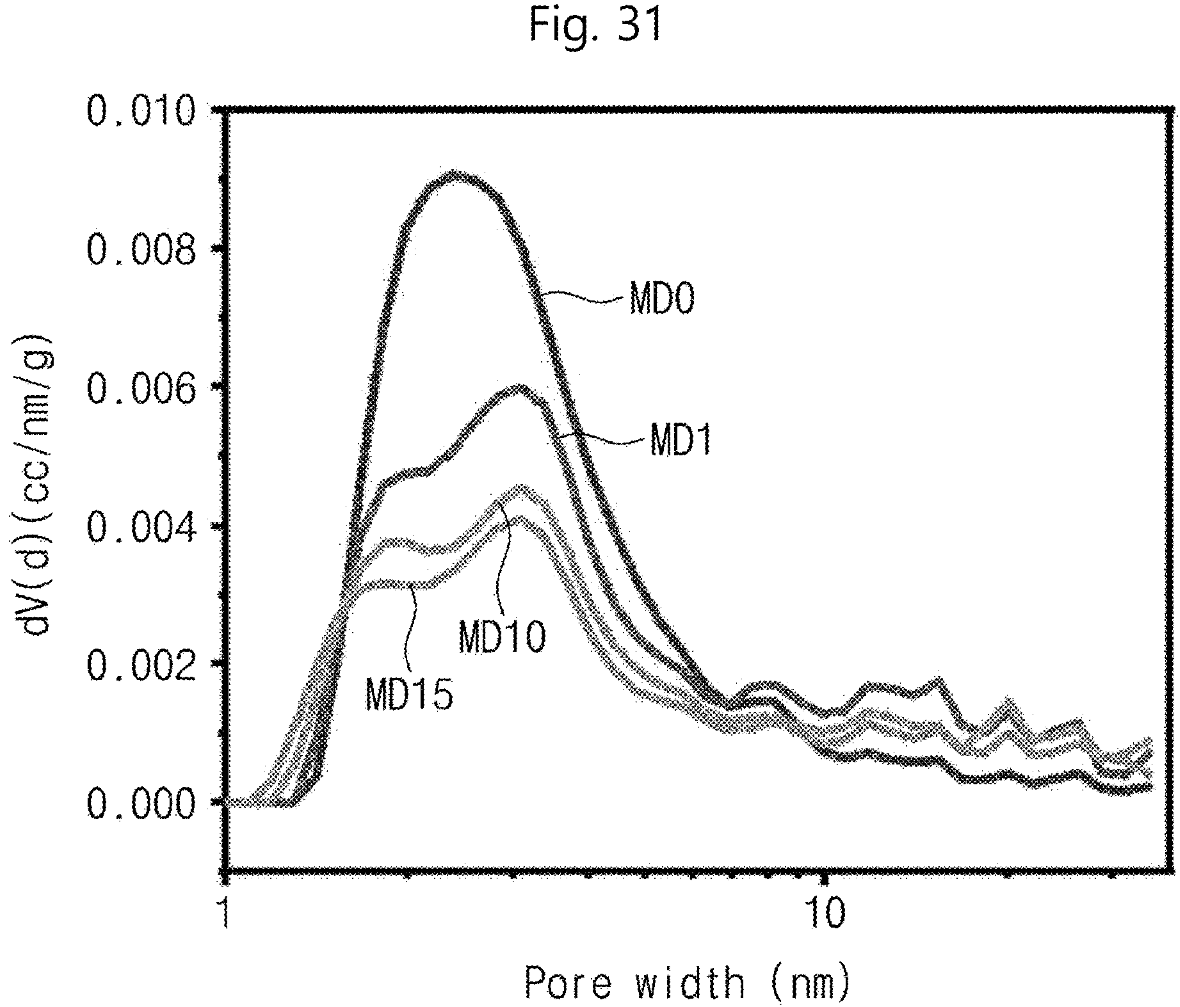
FIG. 31 is a view for explaining a pore volume of the secondary particles according to Experimental Example 6 of the present application.
Figure 32:
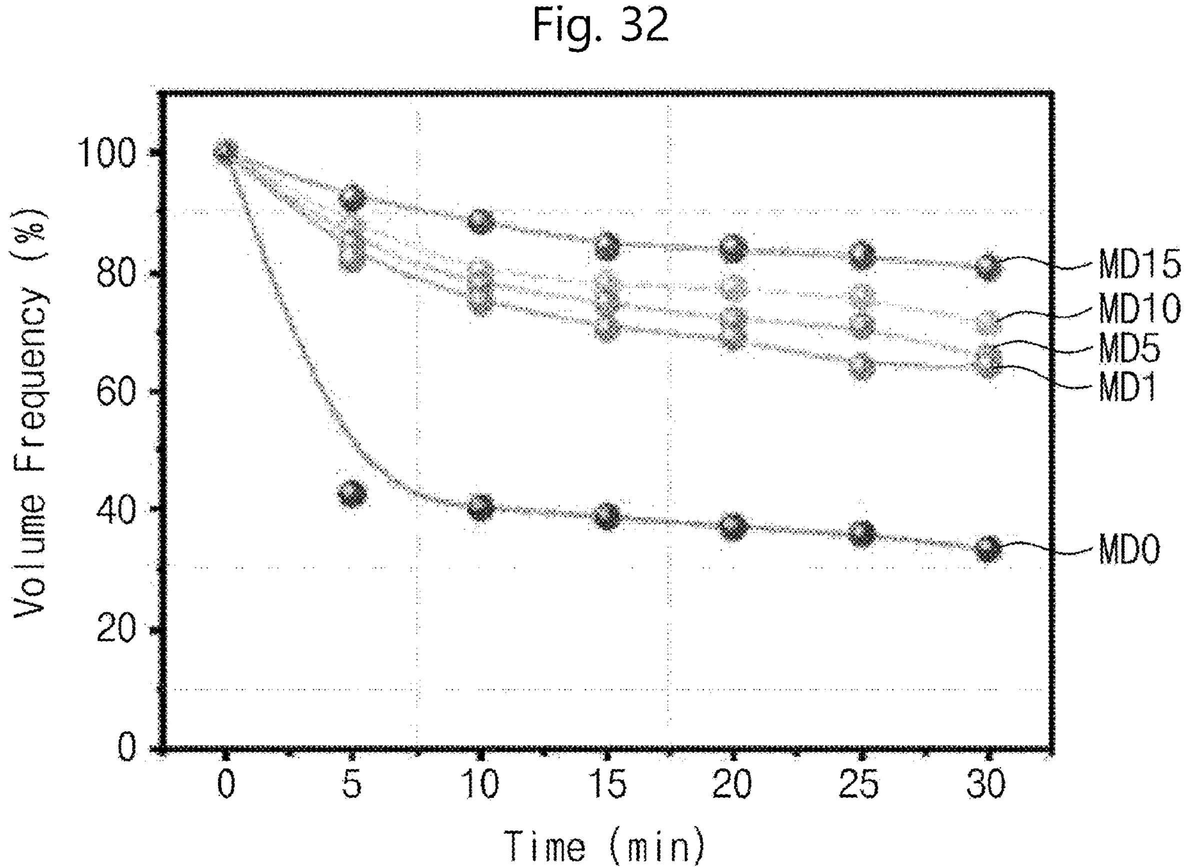
Figure 34:
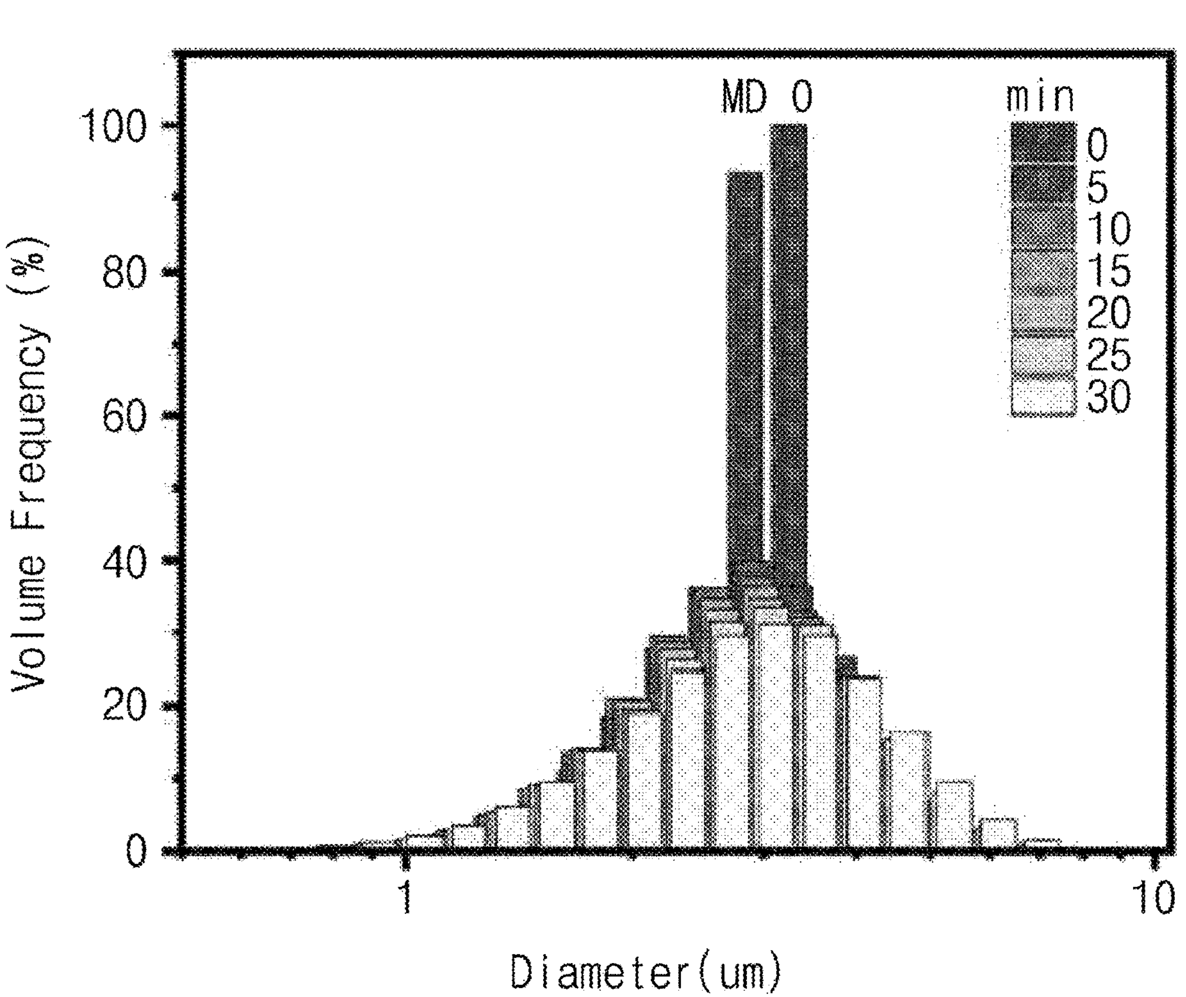

FIG. 31 is a view for explaining a pore volume of the secondary particles according to Experimental Example 6 of the present application.

Referring to FIG. 31, after a plurality of samples are produced by controlling the content of the intermediate particles to be different from that of the primary particles during the process of producing the secondary particles according to Experimental Example 6, a pore volume of each sample is measured and shown. The MD0 to MD15 are as described with reference to FIG. 29. The measured pore volume is summarized in Table 11 below.

TABLE 11

| Classification | Pore volume (cc/g) |
|---|---|
| MD0 | 0.03163 |
| MD1 | 0.02795 |
| MD10 | 0.02194 |
| MD15 | 0.01944 |

As can be seen from FIG. 31 and <Table 11>, as the content of the intermediate particles increased, the pore volume of the secondary particles decreased.

FIGS. 32 to 35 are views for explaining PSA characteristics relative to ultrasonic impact of the secondary particles according to Experimental Example 6 of the present application.

Referring to FIGS. 32 to 35, after a plurality of samples were produced by controlling such that a content of the intermediate particles was different from that of the primary particles during the process of producing the secondary particles according to Experimental Example 6, PSA characteristics for each sample relative to an ultrasonic impact are measured and shown. The MD0 to MD15 are as described with reference to FIG. 29.

As can be seen from FIGS. 32 to 35, when the intermediate particles are not present (MD0), the h-BN primary particles were not bounded or sintered by the heat treatment at 1100° C., so that the secondary particles were immediately loosened due to the ultrasonic impact, whereas when the intermediate particles are present, it is confirmed that the maximum peak of the particle size is maintained at equal to or greater than 80%. That is, it is confirmed that even when the secondary particles according to Experimental Example 6 are dispersed in water and subjected to the ultrasonic treatment under the conditions of 20 KHz and 200 W, the maximum peak of the particle size is maintained at greater than 80%.

Figure 36:
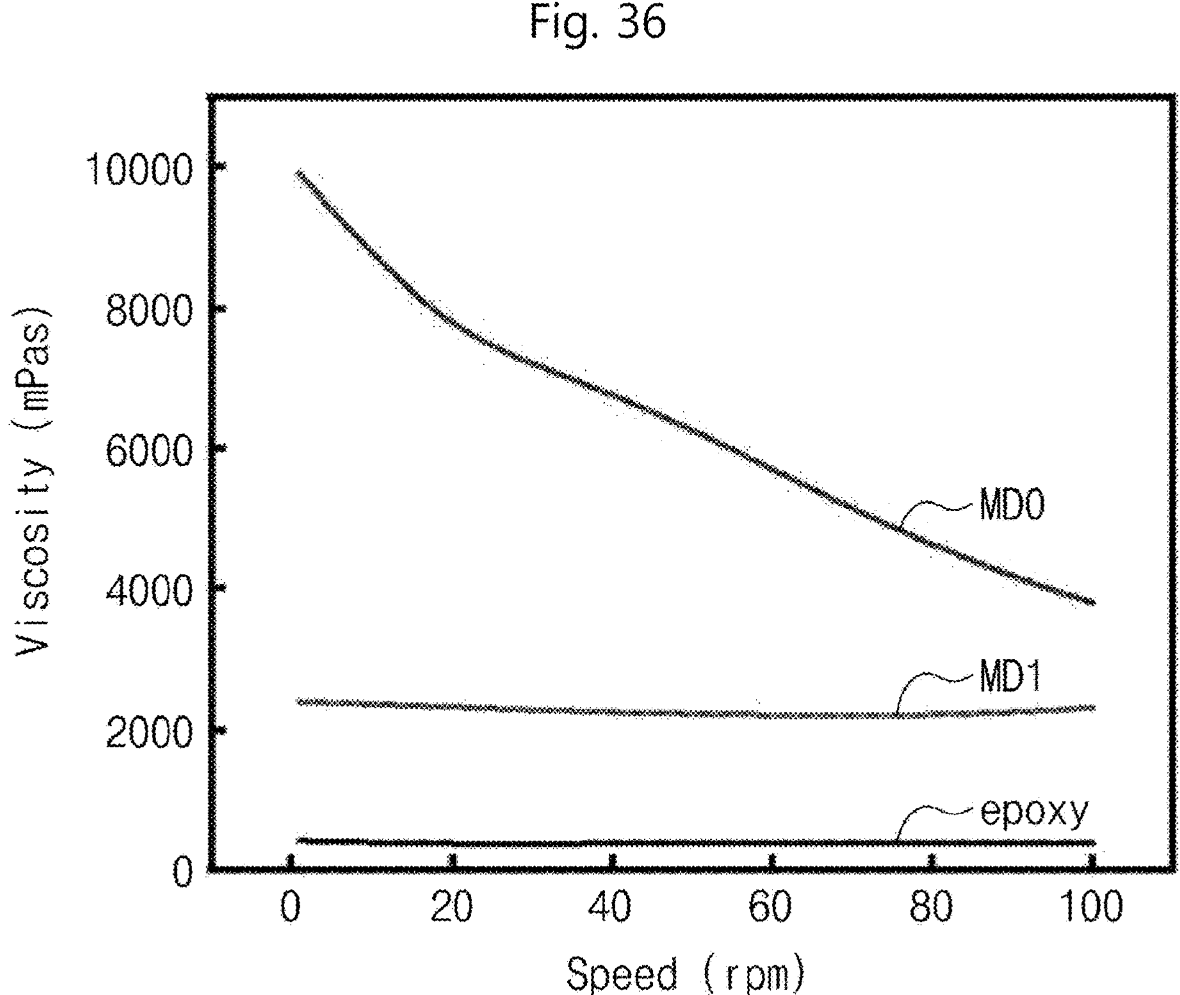
FIG. 36 is a view for explaining viscosity characteristics when the secondary particles are dispersed in an epoxy resin according to Experimental Example 6 of the present application.

FIG. 36 is a view for explaining viscosity characteristics when the secondary particles are dispersed in an epoxy resin according to Experimental Example 6 of the present application.

Referring to FIG. 36, after a plurality of samples are produced by controlling the content of the intermediate particles to be different from that of the primary particles in the process of producing the secondary particles according to Experimental Example 6, each sample is dispersed in an epoxy resin, and a viscosity thereof is measured and shown. The MD0 and MD1 are as described with reference to FIG. 29.

As can be seen from FIG. 36, when the intermediate particles are not present (MD0), all the secondary particles were loosened in the epoxy resin so that the viscosity rapidly increased, whereas when the intermediate particles are present (MD1), it is confirmed that Newton's fluid properties (properties in which viscosity is maintained regardless of rpm) are obtained.

FIG. 37 is an SEM photograph of a state in which secondary particles are dispersed in the epoxy resin according to Experimental Example 6 of the present application.

Referring to FIG. 37, after a plurality of samples are produced by controlling the content of the intermediate particles to be different from that of the primary particles during the process of producing the secondary particles according to Experimental Example 6, each sample is dispersed in an epoxy resin and a dispersed state of each sample is shown by capturing the SEM photographs. A photograph shown at an upper portion of FIG. 37 is a photograph capturing MD0, and a photograph shown at a lower portion of FIG. 37 is a photograph capturing MD1. The MD0 and MD1 are as described with reference to FIG. 29.

As can be seen from FIG. 37, when the intermediate particles are not present (MD0), all the secondary particles were loosened in the epoxy resin, whereas when the intermediate particles are present (MD1), it is confirmed that a shape of the secondary particle is maintained.

While the present invention has been described in connection with the embodiments, it is not to be limited thereto but will be defined by the appended claims. In addition, it is to be understood that those skilled in the art can substitute, change or modify the embodiments in various forms without departing from the scope and spirit of the present invention.

INDUSTRIAL APPLICABILITY

The heat dissipation material, the composition including the same, and the method for producing the same according to the embodiment of the present invention may be applied to heat dissipation industry.

The invention claimed is:

1. A method for producing a heat dissipation material, the method comprising:

preparing primary particles;

producing a dispersion solution by mixing the primary particles, a binder, a dispersant, and a solvent;

producing a base source by adding a boron source and a nitrogen source to the dispersion solution and dissolving the boron source and the nitrogen source;

producing droplets by spraying the base source, and drying the droplets to produce preliminary secondary particles including primary aggregated particles in which a plurality of primary particles are aggregated and intermediate particles in which the boron source and the nitrogen are reacted; and producing secondary particles by sintering the preliminary secondary particles, and mixing a plurality of secondary particles with a polymer resin to produce a heat dissipation material, wherein the solvent includes at least one of pure water, ultrapure water, chloroform, chlorobenzene, acetic acid, acetone, acetonitrile, aniline, benzene, benzonitrile, benzyl alcohol, bromobenzene, bromoform, 1-butanol, 2-butanol, carbon disulfide, carbon tetrachloride, cyclohexane, cyclohexanol, decalin, dibromethane, diethylene glycol, diethylene glycol ether, diethyl ether, dimethoxymethane, N,N-dimethylformamide, ethanol, ethylamine, ethylbenzene, ethylene glycol ether, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, or methyl pyrrolidone.

2. The method of claim 1, wherein in the producing of the base source, a ratio of the boron source to the nitrogen source (boron source:nitrogen source) added to the dispersion solution is controlled to be equal to or greater than 7:1 and equal to or less than 14:1.

3. The method of claim 1, wherein the secondary particles are produced by sintering the preliminary secondary particles at a temperature of 1100° C. or higher and lower than 1500° C.

4. The method of claim 1, wherein in a process of producing the secondary particles, as the preliminary secondary particles are sintered, the intermediate particle is formed to have a phase identical to a phase of the primary aggregated particle.

5. The method of claim 1, further comprising substituting a nitrogen group present on a surface of the primary particle with a first functional group by surface-treating the primary particles after the producing of the primary particles and before the producing of the dispersion solution.

6. A method for producing a thermal interface layer, the method comprising:

preparing the heat dissipation material produced according to claim 1; and providing the heat dissipation material and applying a pressure in order to produce the thermal interface layer using the heat dissipation material, and compressing a plurality of secondary particles with a load exceeding a compressive strength of the secondary particles.

7. The method of claim 6, wherein at least a portion of the plurality of secondary particles is collapsed and fragmented into a plurality of pieces, and a plurality of uncollapsed secondary particles and the plurality of pieces coexist while being mixed with each other in the thermal interface layer.

* * * * *